(12) United States Patent
Cui et al.

(10) Patent No.: US 12,339,504 B2
(45) Date of Patent: Jun. 24, 2025

(54) OPTICAL MODULE

(71) Applicant: Hisense Broadband Multimedia Technologies Co., Ltd., Shandong (CN)

(72) Inventors: Wei Cui, Shandong (CN); Baofeng Si, Shandong (CN); Xuxia Liu, Shandong (CN); Hongchao Pan, Shandong (CN); Qian Shao, Shandong (CN); Sigeng Yang, Shandong (CN); Peng He, Shandong (CN); Chengshuang Luo, Shandong (CN); Fenglai Wang, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 570 days.

(21) Appl. No.: 17/671,186

(22) Filed: Feb. 14, 2022

(65) Prior Publication Data

US 2022/0163741 A1    May 26, 2022

Related U.S. Application Data

(63) Continuation-in-part of application No. PCT/CN2021/101606, filed on Jun. 22, 2021.

(30) Foreign Application Priority Data

Oct. 23, 2020 (CN) .......................... 202011146174.0
Oct. 23, 2020 (CN) .......................... 202011147831.3
Oct. 23, 2020 (CN) .......................... 202011147846.X

(51) Int. Cl.
G02B 6/42    (2006.01)

(52) U.S. Cl.
CPC ......... *G02B 6/4277* (2013.01); *G02B 6/4206* (2013.01); *G02B 6/4244* (2013.01)

(58) Field of Classification Search
CPC ....................................................... G02B 6/42
(Continued)

(56) References Cited

U.S. PATENT DOCUMENTS 4,653,845 A * 3/1987 Tremblay ............. G02B 6/2808
385/56
6,257,772 B1 * 7/2001 Nakanishi ........... H01L 31/0203
257/E31.118
(Continued)

FOREIGN PATENT DOCUMENTS

CN       103424812 A    12/2013
CN       203745692 U     7/2014
(Continued)

OTHER PUBLICATIONS

International Search Report and Written Opinion issued in corresponding International Application No. PCT/CN2021/101606 dated Sep. 24, 2021.
(Continued)

*Primary Examiner* — Kaveh C Kianni
(74) *Attorney, Agent, or Firm* — Morgan, Lewis & Bockius LLP

(57)    ABSTRACT

An optical module includes a shell, a circuit board, at least one of a light-transmitting chip or a light-receiving chip, a lens assembly and a claw assembly. The lens assembly includes a lens base and a connecting part. The lens base covers the at least one of the light-transmitting chip or the light-receiving chip, and is configured to change a propagation direction of an optical signal incident into the lens assembly. The connecting part includes at least one positioning slot disposed on a surface of the connecting part facing away from the lens base. The claw assembly includes a claw and a through hole. The claw includes at least one positioning protrusion disposed on a surface of the claw (Continued)

facing the connecting part. The through hole is configured to be connected to an optical fiber outside the optical module.

19 Claims, 16 Drawing Sheets

(58) Field of Classification Search
USPC .......................................................... 385/33
See application file for complete search history.

(56) References Cited

U.S. PATENT DOCUMENTS

| | | | | |
|---|---|---|---|---|
| 6,374,021 | B1* | 4/2002 | Nakanishi | G02B 6/4246 385/88 |
| 6,954,592 | B2* | 10/2005 | Tan | H04B 10/43 398/138 |
| 6,990,262 | B2 | 1/2006 | Sato | G02B 6/4201 385/94 |
| 8,025,444 | B2* | 9/2011 | Choi | G02B 6/42 385/88 |
| 8,540,434 | B2* | 9/2013 | Kruchowski | G02B 6/3829 385/39 |
| 8,842,952 | B2* | 9/2014 | Tanaka | G02B 6/4259 385/52 |
| 9,325,445 | B2* | 4/2016 | Khor | G02B 6/4215 |
| 9,644,830 | B2* | 5/2017 | Chen | F21V 29/83 |
| 10,082,633 | B2* | 9/2018 | Schaevitz | G02B 6/4228 |
| 10,345,542 | B2* | 7/2019 | Rockman | G02B 6/4246 |
| 11,378,761 | B2* | 7/2022 | Zhai | G02B 6/4246 |
| 11,515,356 | B2* | 11/2022 | Pezeshki | G02B 6/4257 |
| 11,624,879 | B2* | 4/2023 | Grann | G02B 6/4249 385/14 |
| 2002/0039464 | A1* | 4/2002 | Yoshimura | H01L 24/24 257/E25.032 |
| 2002/0085390 | A1* | 7/2002 | Kiyomoto | F21V 5/04 257/E33.059 |
| 2010/0098374 | A1* | 4/2010 | Althaus | G02B 6/4214 250/580 |
| 2011/0101255 | A1* | 5/2011 | Tamura | G02B 6/4246 250/551 |
| 2012/0224817 | A1* | 9/2012 | Hayashi | H01S 5/02253 385/93 |
| 2013/0022309 | A1* | 1/2013 | Yu | G02B 6/4201 385/14 |
| 2014/0169027 | A1* | 6/2014 | Cochran | F21V 29/75 362/555 |
| 2015/0071593 | A1 | 3/2015 | Kanke | |
| 2015/0268425 | A1* | 9/2015 | de Jong | G02B 6/4214 385/33 |
| 2015/0331212 | A1* | 11/2015 | Contag | G02B 6/43 438/31 |
| 2016/0195473 | A1* | 7/2016 | Fujiwara | G01N 21/4795 250/553 |
| 2016/0266322 | A1* | 9/2016 | Epitaux | G02B 6/2938 |
| 2016/0316191 | A1* | 10/2016 | McColloch | G02B 6/4215 |
| 2017/0131488 | A1 | 5/2017 | Yu et al. | |
| 2017/0179682 | A1* | 6/2017 | Ishii | A61B 5/1455 |
| 2017/0211247 | A1* | 7/2017 | Messiou | B64F 1/205 |
| 2017/0315315 | A1 | 11/2017 | Zhou et al. | |
| 2017/0371115 | A1* | 12/2017 | Rockman | G02B 6/4214 |
| 2018/0260602 | A1* | 9/2018 | He | A61B 5/0075 |
| 2018/0267263 | A1 | 9/2018 | Wang et al. | |
| 2020/0363595 | A1* | 11/2020 | Grann | G02B 6/4214 |
| 2021/0055487 | A1* | 2/2021 | Zhai | G02B 6/4215 |
| 2022/0102583 | A1* | 3/2022 | Baumheinrich | G02B 6/12004 |
| 2022/0252229 | A1* | 8/2022 | Choi | F21S 43/195 |

FOREIGN PATENT DOCUMENTS

| | | |
|---|---|---|
| CN | 105929492 A | 9/2016 |
| CN | 106842439 A | 6/2017 |
| CN | 106950657 A | 7/2017 |
| CN | 107024746 A | 8/2017 |
| CN | 107660115 A | 2/2018 |
| CN | 108681002 A | 10/2018 |
| CN | 110501789 A | 11/2019 |
| CN | 110582712 A | 12/2019 |
| CN | 110989103 A | 4/2020 |
| CN | 111239934 A | 6/2020 |
| CN | 111736278 A | 10/2020 |
| CN | 112230347 A | 1/2021 |
| CN | 112230349 A | 1/2021 |
| CN | 112230350 A | 1/2021 |

OTHER PUBLICATIONS

Office Action issued in corresponding Chinese Patent Application No. 202011147846.X dated Oct. 22, 2021, with English translation.
Office Action issued in corresponding Chinese Patent Application No. 202011146174.0 dated Oct. 22, 2021, with English translation.
Office Action issued in corresponding Chinese Patent Application No. 202011147831.3 dated Oct. 22, 2021, with English translation.

* cited by examiner

OPTICAL MODULE

CROSS-REFERENCE TO RELATED APPLICATIONS

This application is a continuation-in-part Application of International Application No. PCT/CN2021/101606 filed on Jun. 22, 2021, which claims priority to Chinese Patent Application No. 202011146174.0 filed on Oct. 23, 2020, Chinese Patent Application No. 202011147831.3 filed on Oct. 23, 2020, and Chinese Patent Application No. 202011147846.X filed on Oct. 23, 2020, which are incorporated herein by reference in their entirety.

TECHNICAL FIELD

The present disclosure relates to the field of optical communication technologies, and in particular, to an optical module.

BACKGROUND

Optical communication technologies are used in new services and application modes such as cloud computing, mobile internet and video conferencing. In the optical communication, an optical module is a tool for achieving inter-conversion between an optical signal and an electrical signal, and is one of key devices in an optical communication device. The optical module generally includes an optical transmitting device and an optical receiving device. The optical transmitting device is configured to convert an electrical signal into an optical signal and transmitted the optical signal through a fiber, and the optical receiving device is configured to convert an optical signal transmitted by the fiber into an electrical signal.

SUMMARY

An optical module is provided. The optical module includes a shell, a circuit board, at least one of a light-transmitting chip or a light-receiving chip, a lens assembly and a claw assembly. The circuit board is disposed in the shell. The at least one of the light-transmitting chip or the light-receiving chip is disposed on the circuit board and electrically connected to the circuit board; the light-transmitting chip is configured to generate an optical signal, and the light-receiving chip is configured to receive an optical signal from an outside of the optical module. The lens assembly is disposed on the circuit board, and the lens assembly includes a lens base and a connecting part. The lens base covers the at least one of the light-transmitting chip or the light-receiving chip, and is configured to change a propagation direction of an optical signal incident into the lens assembly. The connecting part includes at least one positioning slot disposed on a surface of the connecting part facing away from the lens base. The claw assembly is optically connected to the lens assembly, and the claw assembly includes a claw and a through hole. The claw includes at least one positioning protrusion disposed on a surface of the claw facing the connecting part, and the at least one positioning protrusion is inserted into a corresponding positioning slot. The through hole penetrates a surface of the claw facing the lens assembly and a surface of the claw facing away from the lens assembly, and the through hole is configured to be connected to an optical fiber outside the optical module.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals to which the embodiments of the present disclosure relate.

DETAILED DESCRIPTION

Figure 1A:
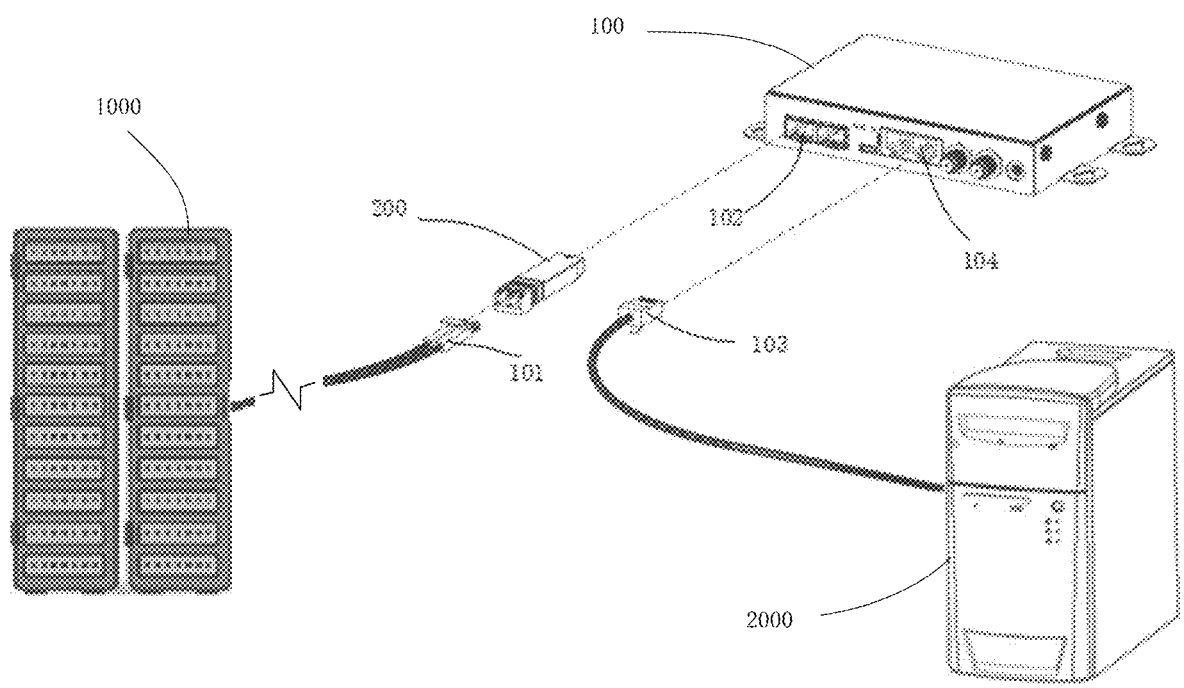
FIG. 1A is a connection relationship diagram of an optical communication system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the term such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of "adapted to" or "configured to" herein implies an open and inclusive expression that does not exclude devices adapted to or configured to perform additional tasks or steps.

The term "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In an optical communication system, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, a signal transmitted by the information transmission device such as the optical fiber or the optical waveguide is an optical signal, while a signal that can be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of the interconversion between the optical signal and the electrical signal in the field of optical fiber communication technology. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of data information and grounding. The optical network terminal transmits the electrical signal to the information processing device such as the computer through a network cable or wireless fidelity (Wi-Fi).

Figure 1B:
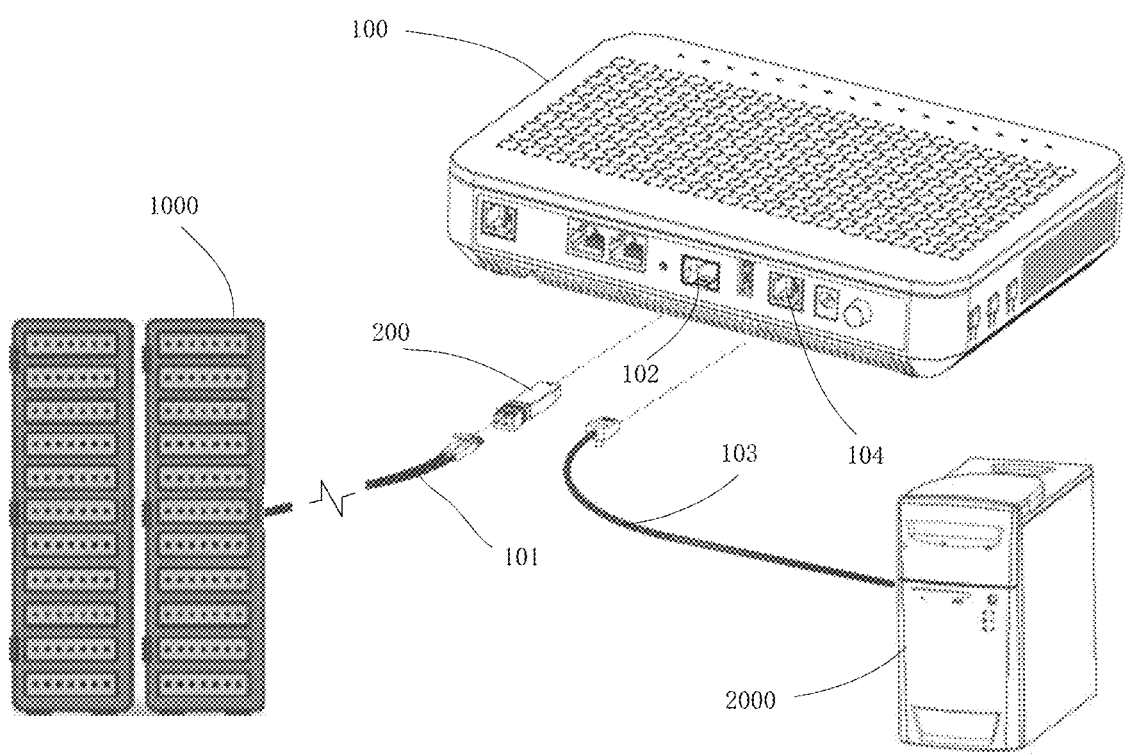
FIG. 1B is a connection relationship diagram of another optical communication system, in accordance with some embodiments.

FIG. 1A is a diagram of a connection relationship of an optical communication system in accordance with some embodiments, and FIG. 1B is a diagram of a connection relationship of another optical communication system in accordance with some embodiments. As shown in FIGS. 1A and 1B, the optical communication system includes a remote server 1000, a local information processing device 2000, an optical network terminal 100, an optical module 200, an optical fiber 101 and a network cable 103.

One end of the optical fiber 101 is connected to the remote server 1000, and the other end of the optical fiber 101 is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and the other end of the network cable 103 is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completely by the optical fiber 101 and the network cable 103, and connection between the optical fiber 101 and the network cable 103 is completely by the optical module 200 and the optical network terminal 100.

The optical module 200 includes an optical port and an electrical port. The optical port is configured to access the optical fiber 101, so that a bidirectional optical signal connection is established between the optical module 200 and the optical fiber 101; and the electrical port is configured to access the optical network terminal 100, so that a bidirectional electrical signal connection is established between the optical module 200 and the optical network terminal 100. Interconversion between the optical signal and the electrical signal is achieved by the optical module 200, so that information connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that a bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
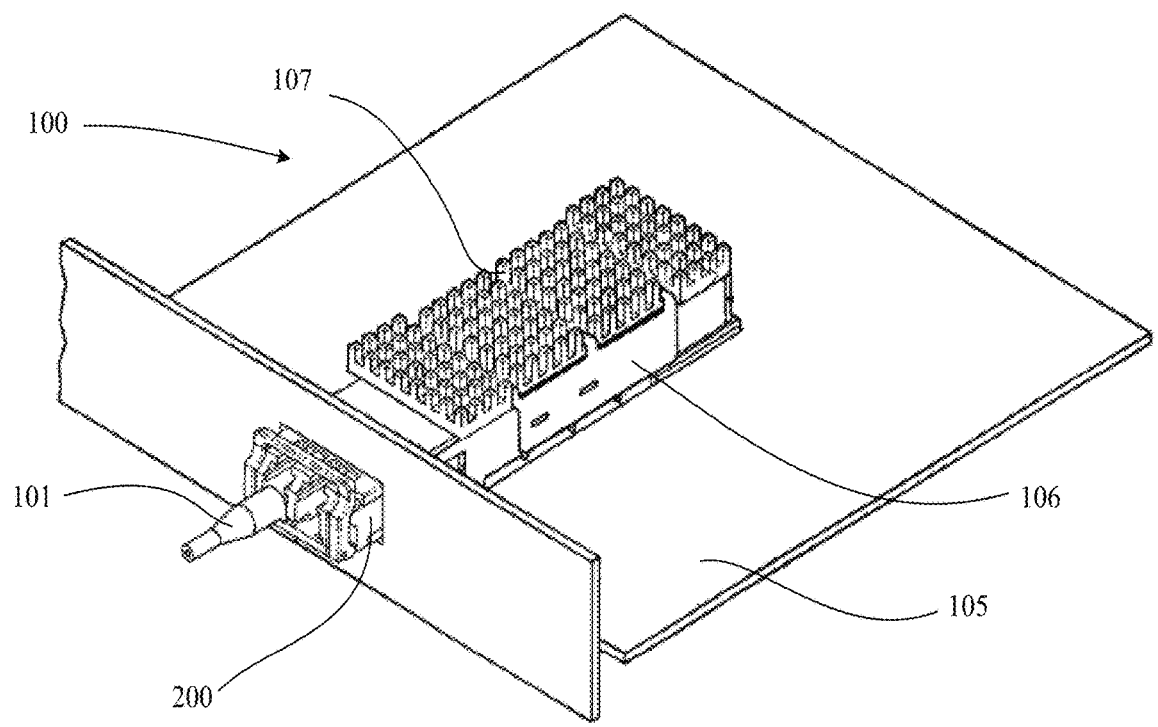
FIG. 2 is a structural diagram of an optical network terminal, in accordance with some embodiments.

FIG. 2 is a structural diagram of an optical network terminal in accordance with some embodiments. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protruding portions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
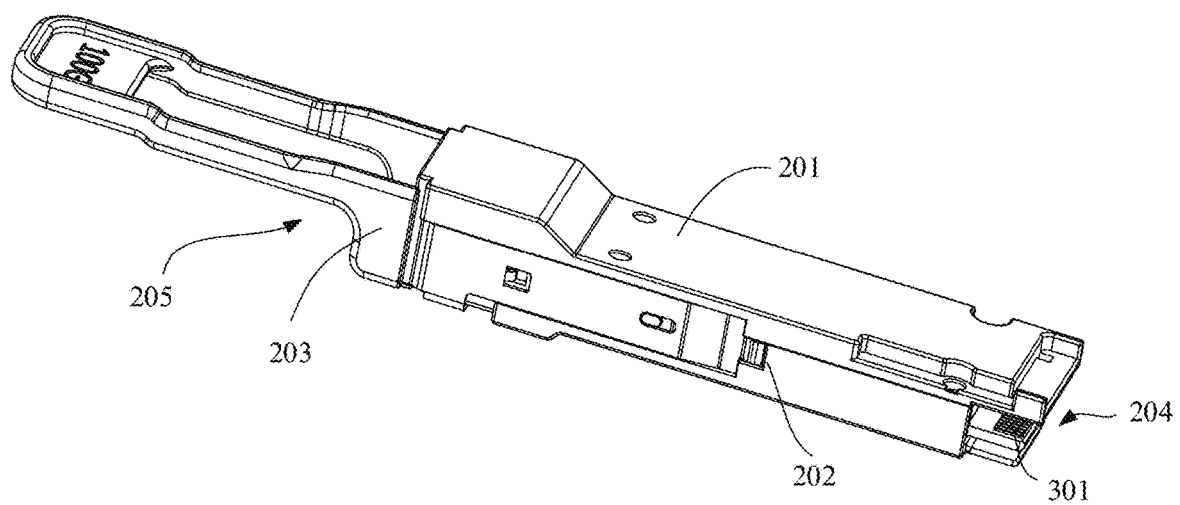
FIG. 3 is a structural diagram of an optical module, in accordance with some embodiments.
Figure 4:
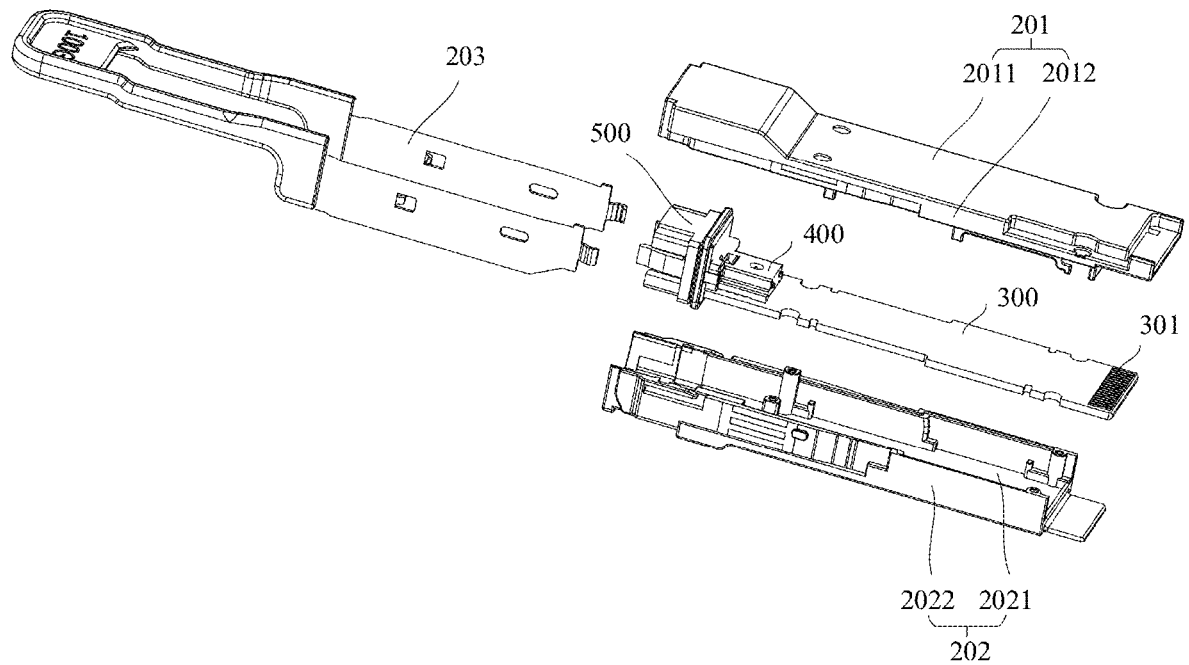
FIG. 4 is an exploded view of an optical module, in accordance with some embodiments.

FIG. 3 is a structural diagram of an optical module in accordance with some embodiments, and FIG. 4 is an exploded structural diagram of an optical module in accordance with some embodiments. As shown in FIGS. 3 and 4, the optical module 200 includes a shell, a circuit board 300, a lens assembly 400 and a claw assembly 500 which are disposed in the shell.

The shell includes an upper shell 201 and a lower shell 202. The upper shell 201 covers the lower shell 202 to form the above shell with two openings, and an outer contour of the shell is generally in a cuboid shape.

In some embodiments of the present disclosure, the lower shell 202 includes a bottom plate 2021 and two lower side plates 2022 located on two sides of the bottom plate 2021 respectively and disposed perpendicular to the bottom plate 2021; the upper shell 201 includes a cover plate 2011, and the cover plate 2011 covers the two lower side plates 2022 of the lower shell 202 to form the above shell.

In some embodiments, the lower shell 202 includes the bottom plate 2021 and the two lower side plates 2022 located on two sides of the bottom plate 2021 respectively and disposed perpendicular to the bottom plate 2021; the upper shell 201 includes the cover plate 2011 and two upper side plates 2012 located on two sides of the cover plate 2011 respectively and disposed perpendicular to the cover plate 2011; and the two upper side plates 2012 are combined with the two lower side plates 2022 respectively, so that the upper shell 201 covers the lower shell 202.

A direction in which a connecting line between the two openings 204 and 205 is located may be the same as a longitudinal direction of the optical module 200, or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located at a side of the optical module 200. The opening 204 is the electrical port, a connecting finger 301 extends from the electrical port 204, and inserts into the master monitor (e.g., the optical network terminal 100). The opening 205 is the optical port, and is configured to assess an external optical fiber 101, so that the external optical fiber 101 is connected to the lens assembly 400 inside the optical module 200.

By using an assembly mode of combining the upper shell 201 and the lower shell 202, it is possible to facilitate installation of devices such as the circuit board 300, the lens assembly 400, and the claw assembly 500 into the shell, and the upper shell 201 and the lower shell 202 may form encapsulation protection for these devices. In addition, when devices such as the circuit board 300 and the lens assembly 400 are assembled, it is possible to facilitate arrangement of positioning components, heat dissipation components and electromagnetic shielding components of these devices, which is conducive to implementation of automated production.

In some embodiments, the upper shell 201 and the lower shell 202 are generally made of a metal material, which facilitates electromagnetic shielding and heat dissipation.

In some embodiments, the optical module 200 further includes an unlocking component 203 located outside of the shell, and the unlocking component 203 is configured to implement or release a fixed connection between the optical module 200 and the master monitor.

For example, the unlocking component 203 is located at an outside of the two lower side plates 2022 of the lower shell 202, has an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engagement component of the unlocking component 203 moves with the pulling, and then a connection relationship between the engagement component and the master monitor is changed to release engagement between the optical module 200 and the master monitor, so that the optical module 200 may be drawn out of the cage of the master monitor.

The circuit board 300 includes a circuit wiring, electronic elements and chips. Through the circuit wiring, the electronic elements and the chips are connected together according to a circuit design, so as to implement functions such as power supply, transmission of electrical signals and grounding. The electronic elements may include, for example, a capacitor, a resistor, a triode, and a metal-oxide-semiconductor field-effect transistor (MOSFET). The chips may include, for example, a microcontroller unit (MCU), a limiting amplifier, a clock and data recovery (CDR) chip, a power management chip or a digital signal processing (DSP) chip.

The circuit board 300 is generally a rigid circuit board, and the rigid circuit board may also implement a load-bearing function due to its relatively hard material. For example, the rigid circuit board may stably bear the electronic elements and the chips, and may also be inserted into the electrical connector in the cage 106 of the master monitor.

The circuit board 300 further includes the connecting finger 301 formed on an end surface thereof, and the connecting finger 301 is composed of a plurality of independent pins. The circuit board 300 is inserted into the cage 106, and is conductively connected to the electrical connector in the cage 106 through the connecting finger 301. The connecting finger 301 may be disposed on only a surface (e.g., an upper surface shown in FIG. 4) of the circuit board 300, or may be disposed on both upper and lower surfaces of the circuit board 300 to adapt to an occasion with a demand for a large number of pins. The connecting finger 301 is configured to establish electrical connection with the master monitor to achieve power supply, grounding, transmission of an I2C signal, and transmission of a data signal, etc.

Of course, flexible circuit boards are also used in some optical modules. A flexible circuit board is generally used in conjunction with the rigid circuit board.

Figure 5:
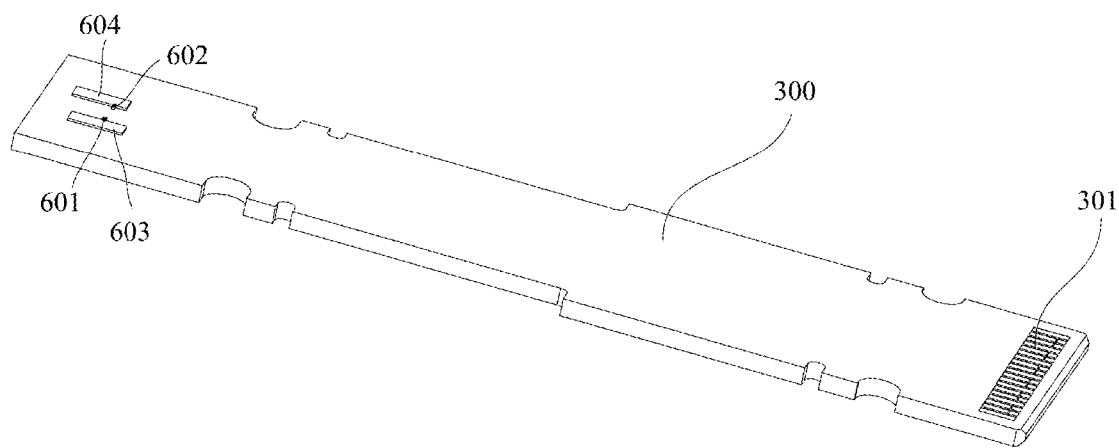
FIG. 5 is a structural diagram of a circuit board and chips located on the circuit board, in accordance with some embodiments.

As shown in FIG. 5, the optical module 200 further includes a light-transmitting chip 601, a driving chip 603, a light-receiving chip 602 and a trans-impedance amplifier chip 604 that are disposed on the circuit board 300. The driving chip 603 is configured to cooperate with the light-transmitting chip 601 to drive the light-transmitting chip 601 to generate an optical signal; the trans-impedance amplifier chip 604 is configured to cooperate with the light-receiving chip 602 to receive an optical signal.

Of course, in some embodiments, the optical module 200 may include only the light-transmitting chip 601 and the driving chip 603, or may include only the light-receiving chip 602 and the trans-impedance amplifier chip 604.

Figure 6:
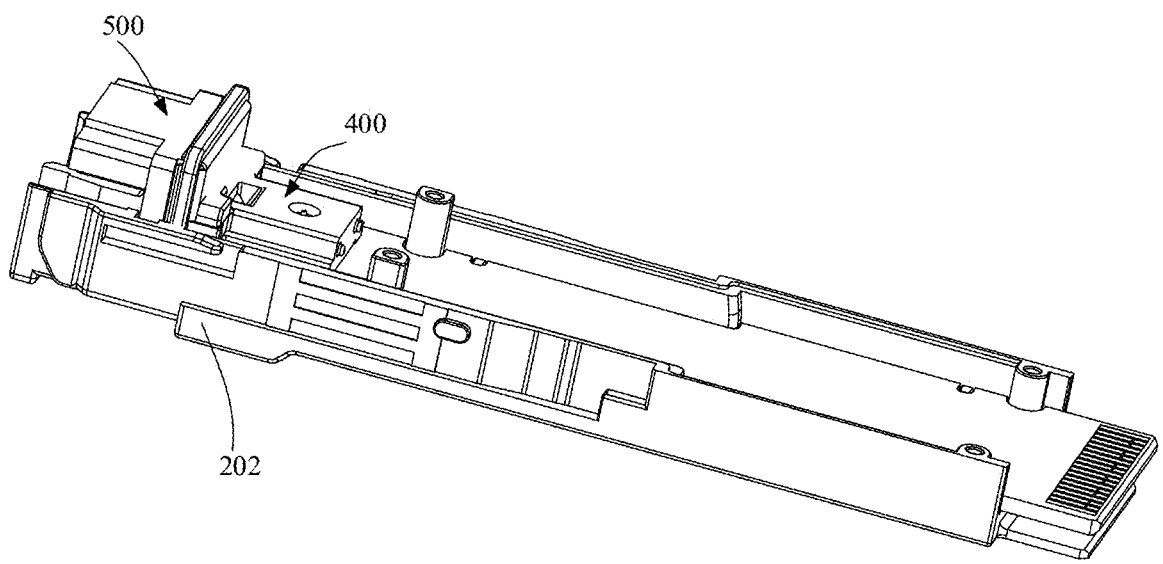
FIG. 6 is an assembly diagram of an optical module with an upper shell and an unlocking component removed, in accordance with some embodiments.

As shown in FIG. 6, the claw assembly 500 is disposed on an end of the circuit board 300 away from the connecting finger 301, and forms the optical port 205 of the optical module 200. One end of the claw assembly 500 assesses the external optical fiber 101, and another end of the claw assembly 500 is directly connected to the lens assembly 400, so that the external optical fiber 101 and the lens assembly 400 are optically connected through the claw assembly 500. Transmission of an optical signal between the lens assembly 400 and the external optical fiber 101 is not dependent on an internal optical fiber ribbon in the optical module 200, which saves space occupied by the internal optical fiber ribbon, reduces manufacturing costs and a reliability risk caused by a damage of the internal optical fiber ribbon.

An optical signal emitted from the light-transmitting chip 601 enters the external optical fiber 101 after passing through the lens assembly 400 and the claw assembly 500, thereby outputting the optical signal to an outside of the optical module 200. An optical signal transmitted from the external optical fiber 101 enters the light-receiving chip 602 after passing through the claw assembly 500 and the lens assembly 400, thereby receiving the optical signal from the outside of the optical module 200.

Figure 7A:
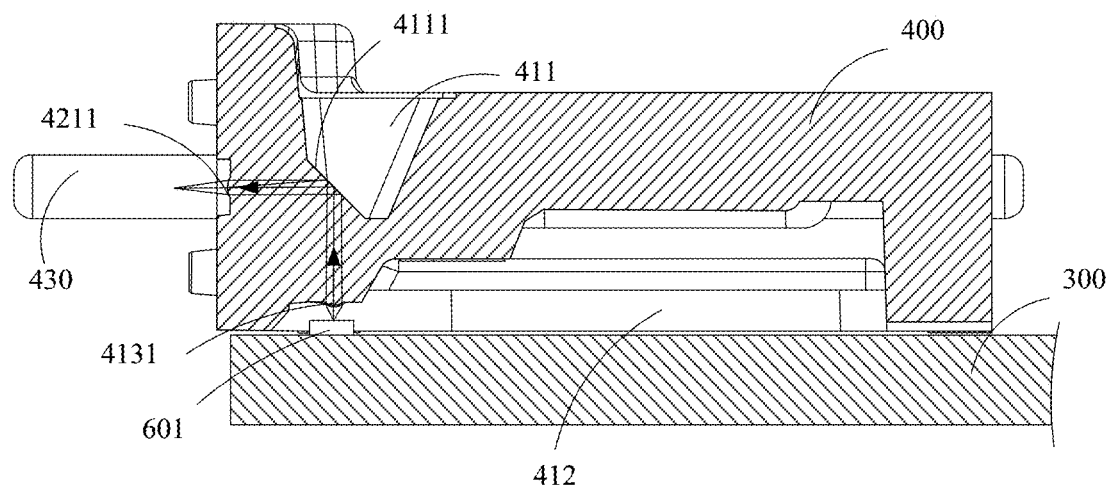
FIG. 7A is a sectional view of a lens assembly disposed on a circuit board, in accordance with some embodiments.
Figure 7B:
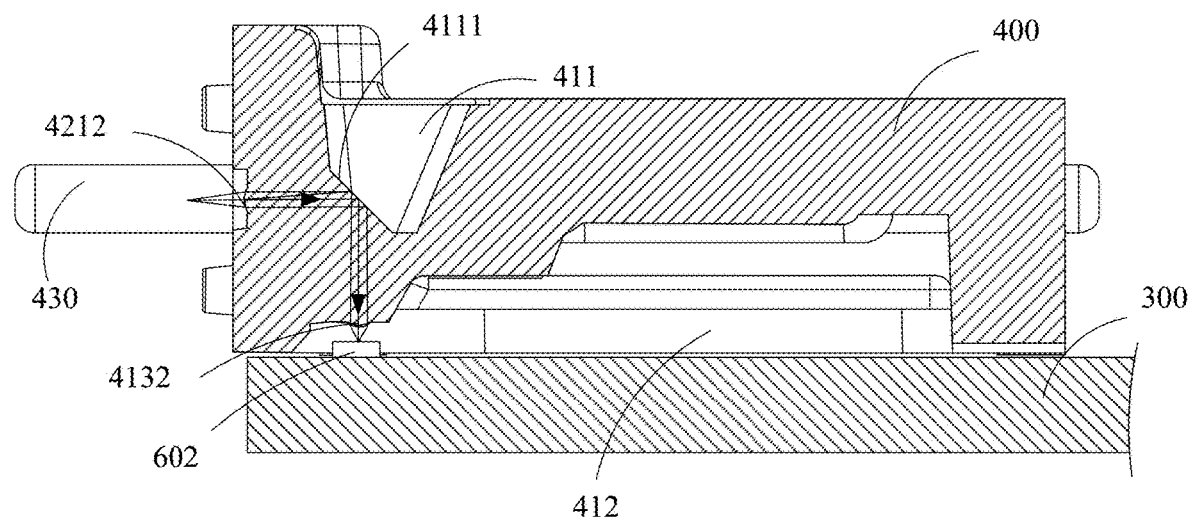
FIG. 7B is another sectional view of a lens assembly disposed on a circuit board, in accordance with some embodiments.

As shown in FIGS. 7A and 7B, the lens assembly 400 is disposed on the circuit board 300, and is configured to change a propagation direction of an optical signal. The lens assembly 400 and the circuit board 300 form an accommodating cavity in which the light-transmitting chip 601, the driving chip 603, the light-receiving chip 602 and the trans-impedance amplifier chip 604 are disposed. The lens assembly 400 covers the light-transmitting chip 601, the driving chip 603, the light-receiving chip 602 and the trans-impedance amplifier chip 604, so that the above chips are located under the lens assembly 400. The light-transmitting chip 601 and the driving chip 603 are both disposed in the accommodating cavity, which shortens a connection line between the two chips and reduces a signal loss caused by the connection line. Similarly, the light-receiving chip 602 and the trans-impedance amplifier chip 604 are both disposed in the accommodating cavity, which also has the above technical effects.

In some embodiments, the optical module 200 includes only the light-transmitting chip 601 and the driving chip 603. In this case, the light-transmitting chip 601 and the driving chip 603 are disposed in the accommodating cavity, and the lens assembly 400 covers the light-transmitting chip 601 and the driving chip 603.

In some other embodiments, the optical module 200 includes only the light-receiving chip 602 and the trans-impedance amplifier chip 604. In this case, the light-receiving chip 602 and the trans-impedance amplifier chip 604 are disposed in the accommodating cavity, and the lens assembly 400 covers the light-receiving chip 602 and the trans-impedance amplifier chip 604.

As shown in FIG. 6 and FIG. 7A, the optical signal emitted from the light-transmitting chip 601 enters the lens assembly 400, and enters the external optical fiber 101 through the claw assembly 500 after being reflected by the lens assembly 400. As shown in FIG. 6 and FIG. 7B, and the optical signal from the external optical fiber 101 enters the lens assembly 400 by passing through the claw assembly 500, and enters the light-receiving chip 602 after being reflected by the lens assembly 400. That is, the lens assembly 400 not only serves to enclose the light-transmitting chip 601 and the light-receiving chip 602, but also establishes optical connections between the light-transmitting chip 601 and the claw assembly 500 and between the light-receiving chip 602 and the claw assembly 500.

Figure 8:
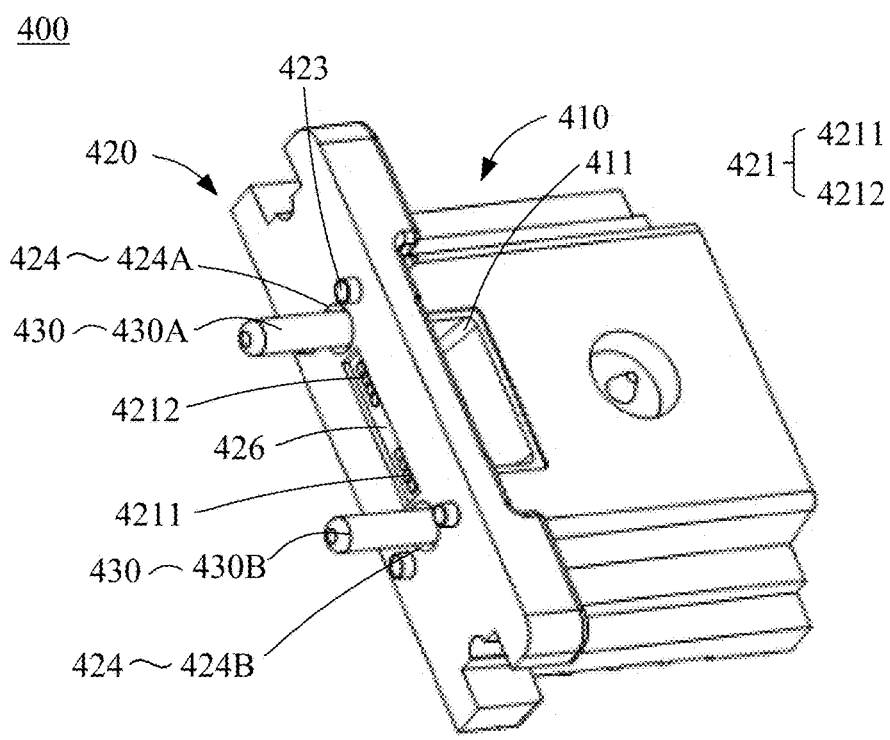
FIG. 8 is a perspective view of a lens assembly, in accordance with some embodiments.
Figure 10:
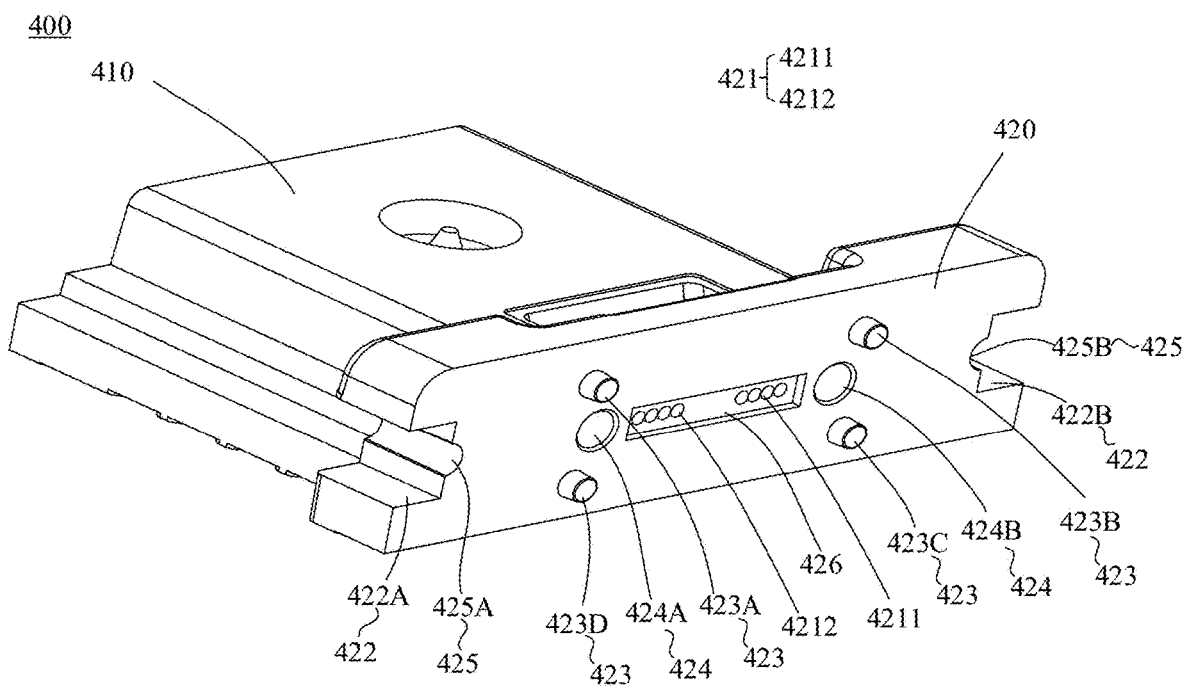
FIG. 10 is a perspective view of the lens assembly shown in FIG. 8 from yet another angle.

As shown in FIGS. 8 and 10, the lens assembly 400 includes a lens base 410 and a connecting part 420. The lens base 410 is covered on the light-transmitting chip 601 and the light-receiving chip 602, and is configured to change the propagation direction of the optical signal. The connecting part 420 is disposed at an end of the lens base 410, and is configured to connect to the claw assembly 500.

Figure 9:
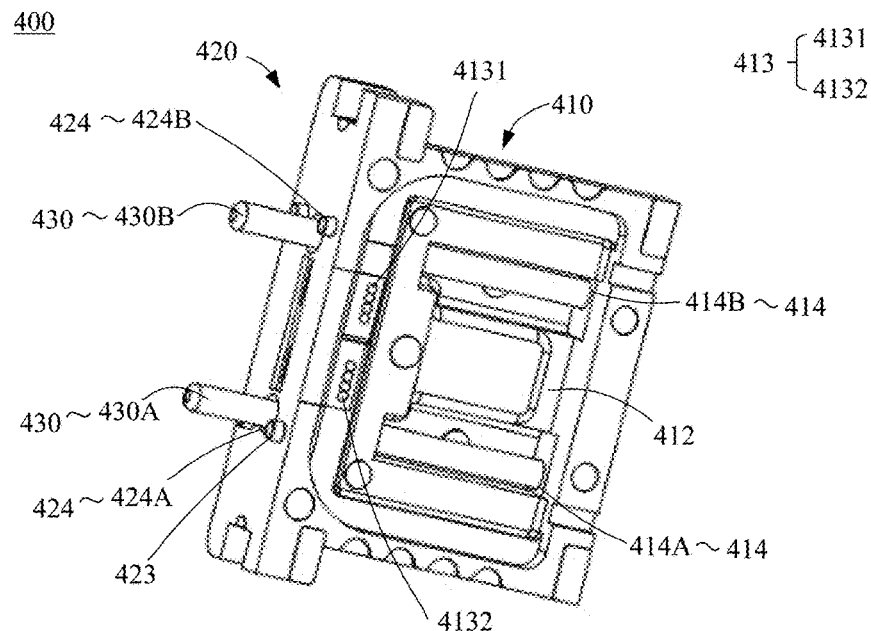
FIG. 9 is a perspective view of the lens assembly shown in FIG. 8 from another angle.
Figure 11:
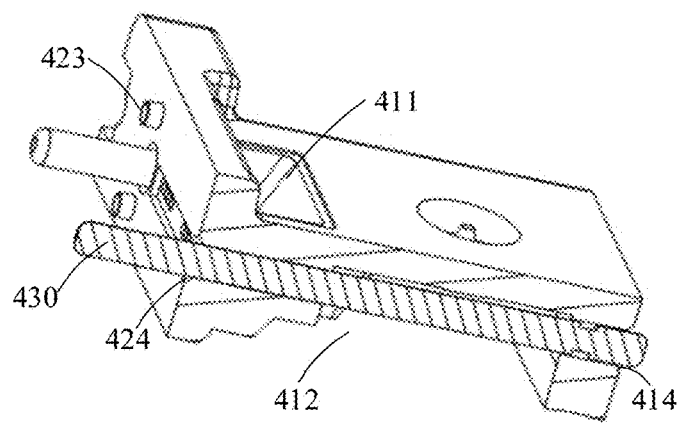
FIG. 11 is a sectional view of a lens assembly, in accordance with some embodiments.

As shown in FIGS. 9 and 11, the lens base 410 includes a first groove 411, a second groove 412 and a first lens array 413. The first groove 411 is disposed on a surface of the lens base 410 away from the circuit board 300 and is recessed toward an inside of the lens base 410. A bottom surface of the first groove 411 is inclined to form a reflective surface 4111 (see FIGS. 7A and 7B). Light transmitted inside the lens base 410 is irradiated on the reflective surface 4111 and is reflected, thereby changing the propagation direction of the optical signal.

The second groove 412 is disposed on a surface of the lens base 410 proximate to the circuit board 300. The second groove 412 and the circuit board 300 enclose the accommodating cavity, and the light-transmitting chip 601 and the light-receiving chip 602 are disposed in the accommodating cavity. An arrangement of the second groove 412 facilitates adjustment and control of a wall thickness of the lens assembly 400, thereby facilitating to ensure that the lens assembly 400 meets precise requirements of various parameters when the lens assembly 400 is prepared by an injection molding process.

In some embodiments, in order to adjust and control the wall thickness of the lens assembly 400, a side wall of the second groove 412 is set in a stepped shape (a left side wall as shown in FIG. 11) to ensure that the lens assembly 400 is evenly cooled during the injection molding process, thereby ensuring that the lens assembly 400 meets the precise requirements of the parameters.

The first lens array 413 is disposed on a surface of the lens base 410 proximate to the circuit board 300 and protrudes to an outside of the lens base 410. The first lens array 413 includes a first collimating lens 4131 and a first focusing lens 4132. The first collimating lens 4131 corresponds to a position of the light-transmitting chip 601, and the first focusing lens 4132 corresponds to a position of the light-receiving chip 602.

As shown in FIG. 8, the connecting part 420 includes a second lens array 421, and the second lens array 421 is disposed on a surface of the connecting part 420 facing the claw assembly 500 and protrudes to an outside of the connecting part 420. The second lens array 421 includes a second focusing lens 4211 and a second collimating lens 4212. The second focusing lens 4211 is located at an optical path of the light-transmitting chip 601, and the second collimating lens 4212 is located at an optical path of the light-receiving chip 602.

It will be noted that the number of the first collimating lens 4131 and the second focusing lens 4211 is the same, and corresponds to the number of the light-transmitting chip 601. The number of the first focusing lens 4132 and the second collimating lens 4212 is the same, and corresponds to the number of the light-receiving chip 602. For example, FIG. 9 shows a plurality of first collimating lenses 4131 and a plurality of first focusing lenses 4132, and FIG. 8 shows a plurality of second focusing lenses 4211 and a plurality of second collimating lenses 4212.

As shown in FIG. 7A, during a process of the optical module 200 emitting an optical signal to the outside, light carrying information emitted by the light-transmitting chip 601 is converted into parallel light by the first collimating lens 4131 and then directed to the reflective surface 4111. The parallel light is reflected by the reflective surface 4111 and then directed to the second focusing lens 4211, and enters the external optical fiber 101 through the claw assembly 500 after being converged by the second focusing lens 4211.

As shown in FIG. 7B, during a process of the optical module 200 receiving an optical signal from the outside of the optical module 200, light carrying information transmitted by the external optical fiber 101 is directed to the second collimating lens 4212 through the claw assembly 500, and is converted into parallel light by the second collimating lens 4212 and then directed to the reflective surface 4111. The parallel light is reflected by the reflective surface 4111 and then directed to the first focusing lens 4132, and enters the light-receiving chip 602 after being converged by the first focusing lens 4132.

In some embodiments, as shown in FIG. 8, the connecting part 420 further includes a light-passing slot 426 disposed on a surface of the connecting part 420 facing the claw assembly 500, and the second lens array 421 is accommodated in the light-passing slot 426. This arrangement may prevent the second lens array 421 from being scratched during an assembling process of the connecting part 420 and the claw assembly 500, and ensure a safety of the second lens array 421 in use.

Figure 12:
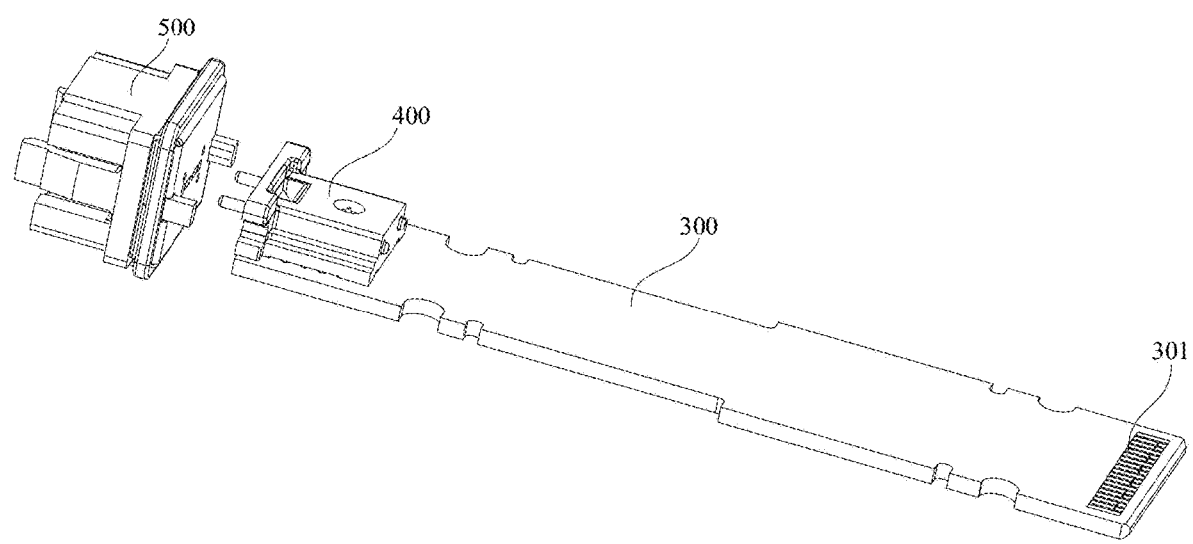
FIG. 12 is a partial exploded view of a claw assembly, a lens assembly, and a circuit board in an optical module, in accordance with some embodiments.
Figure 13:
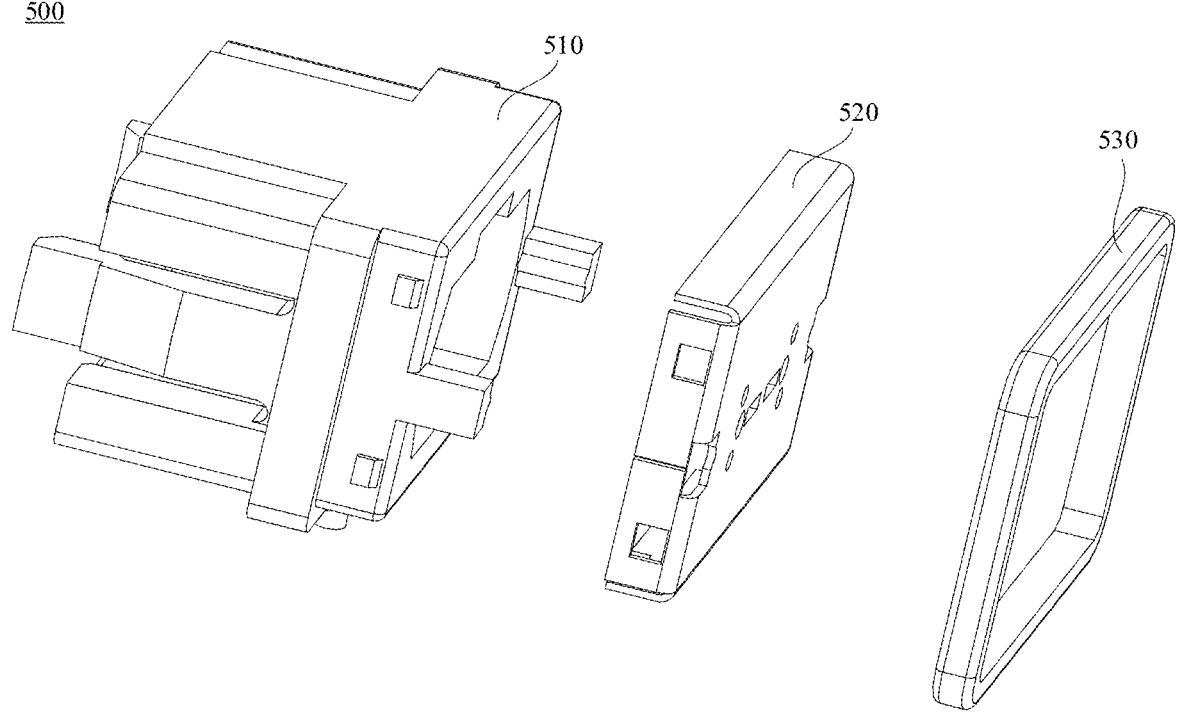
FIG. 13 is an exploded view of a claw assembly in an optical module, in accordance with some embodiments.
Figure 14:
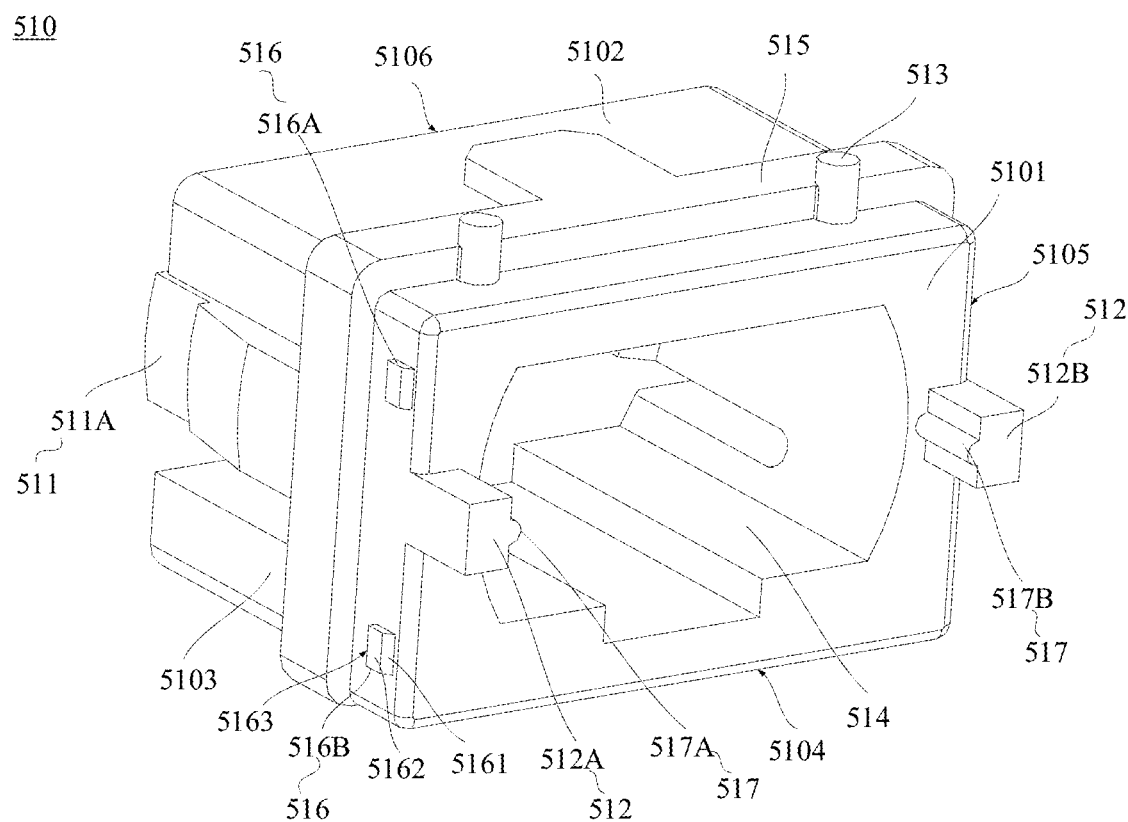
FIG. 14 is a structural diagram of a claw in an optical module, in accordance with some embodiments.

FIG. 12 is a partial exploded view of the claw assembly 500, the lens assembly 400 and the circuit board 300 in an optical module in accordance with some embodiments, FIG. 13 is an exploded view of the claw assembly 500 in an optical module in accordance with some embodiments, and FIG. 14 is a structural diagram of a claw 510 in an optical module in accordance with some embodiments. In some embodiments of the present disclosure, as shown in FIGS. 12 to 14, the claw assembly 500 includes the claw 510, one end of the claw 510 is connected to the external optical fiber 101, and another end of the claw 510 is connected to the lens assembly 400. The claw 510 includes at least one positioning protrusion 512, and the at least one positioning protrusion 512 is disposed on a surface of the claw 510 facing the lens assembly 400 and extends toward the lens assembly 400. The number of the at least one positioning protrusion 512 is not limited in the present disclosure, which may be one, two or more.

It will be noted that a state of the claw 510 shown in FIG. 14 and a state when the claw 510 is installed in the lower shell 202 are upside down.

For example, the claw 510 includes two positioning protrusions 512, which are a first positioning protrusion 512A and a second positioning protrusion 512B, respectively. The first positioning protrusion 512A is disposed on a side of a surface of the claw 510 facing the lens assembly 400 and extends toward the lens assembly 400. The second positioning protrusion 512B is disposed on another side of the surface of the claw 510 facing the lens assembly 400 and extends toward the lens assembly 400.

As shown in FIG. 10, the connecting part 420 of the lens assembly 400 includes at least one positioning slot 422 in one-to-one correspondence to the at least one positioning protrusion 512, and the at least one positioning slot 422 is disposed on a surface of the connecting part 420 facing the claw 510. The positioning protrusion 512 is inserted into the corresponding positioning slot 422 to realize a connection between the claw 510 and the lens assembly 400.

For example, the connecting part 420 includes two positioning slots 422, which are a first positioning slot 422A and a second positioning slot 422B, respectively. The first positioning slot 422A is disposed on a side of the surface of the connecting part 420 facing the claw assembly 500, and the second positioning slot 422B is disposed on another side of the surface of the connecting part 420 facing the claw assembly 500. The first positioning protrusion 512A is inserted into the first positioning slot 422A, and the second positioning protrusion 512B is inserted into the second positioning slot 422B, thereby realizing a connection between the lens assembly 400 and the claw 510.

In some embodiments, the connecting part 420 includes the positioning protrusion, the positioning protrusion is disposed on a surface of the connecting part 420 facing the claw 510 and extends toward the claw 510. The claw 510 includes the positioning slot, the positioning slot is disposed on a surface of the claw 510 facing the lens assembly 400 and corresponds to a position of the positioning protrusion. Through a cooperation of the positioning protrusion of the connecting part 420 and the positioning slot of the claw 510, the connection between the claw 510 and the lens assembly 400 is realized.

In some embodiments, as shown in FIG. 14, the claw 510 further includes at least one limiting protrusion 517 in one-to-one correspondence to the at least one positioning protrusion 512, and the limiting protrusion 517 is disposed on the corresponding positioning protrusion 512. The limiting protrusion 517 and its corresponding positioning protrusion 512 may be independent or an integral structure.

For example, the claw 510 includes two limiting protrusions 517, which are a first limiting protrusion 517A and a second limiting protrusion 517B, respectively. The first limiting protrusion 517A is disposed on a surface of the first positioning protrusion 512A opposite to the second positioning protrusion 512B, and the second limiting protrusion 517B is disposed on a surface of the second positioning protrusion 5126 opposite to the first positioning protrusion 512A.

On this basis, as shown in FIG. 10, the connecting part 420 includes at least one limiting slot 425 in one-to-one correspondence to the at least one limiting protrusion 517. The limiting slot 425 is disposed on the surface of the connecting part 420 facing the claw 510, and communicates with a corresponding positioning slot 422. The limiting protrusion 517 is inserted into the corresponding limiting slot 425 to limit the claw 510.

For example, the connecting part 420 includes two limiting slots 425, which are a first limiting slot 425A and a second limiting slot 425B, respectively. The first limiting slot 425A is disposed on the surface of the connecting part 420 facing the claw 510 and communicates with the first positioning slot 422A. The second limiting slot 425B is disposed on the surface of the connecting part 420 facing the claw 510 and communicates with the second positioning slot 422B. The first limiting protrusion 517A is inserted into the first limiting slot 425A, and the second limiting protrusion 517B is inserted into the second limiting slot 425B, thereby limiting the claw 510.

The present disclosure does not limit a cross-sectional shape of the positioning protrusion 512, which may be circular or rectangular. Accordingly, a shape of the positioning slot 422 is also circular or rectangular. The present disclosure also does not limit a cross-sectional shape of the limiting protrusion 517, which may be semicircular or an arc. Accordingly, a shape of the limiting slot 425 is also semicircular or an arc.

In some embodiments of the present disclosure, the claw 510 may be integrally formed of a polymer material through the injection molding process.

As shown in FIG. 14, the claw 510 further includes a through hole 514, which penetrates a surface of the claw 510 facing the lens assembly 400 and a surface opposite to the surface. The external optical fiber 101 is inserted into the through hole 514 to realize a connection between the claw 510 and the external optical fiber 101, thereby realizing an optical connection between the external optical fiber 101 and the lens assembly 400.

It will be noted that the surface of the claw 510 facing the lens assembly 400 is a first side surface 5101, a surface opposite to the first side surface 5101 is a sixth side surface 5106, and four surfaces connected to the first side surface 5101 are respectively a second side surface 5102, a third side surface 5103, a fourth side surface 5104, and a fifth side surface 5105. The second side surface 5102 and the fourth side surface 5104 are disposed oppositely, and the third side surface 5103 and the fifth side surface 5105 are disposed oppositely. In a case where the claw 510 is installed in the shell, the second side surface 5102 is matched with the lower shell 202, and the fourth side surface 5104 is matched with the upper shell 201.

The optical signal emitted by the light-transmitting chip 601 enters the lens assembly 400, and enters the external optical fiber 101 located in the through hole 514 after being reflected by the lens assembly 400. The optical signal transmitted by the external optical fiber 101 located in the through hole 514 enters the lens assembly 400, and enters the light-receiving chip 602 after being reflected by the lens assembly 400, so as to realize a transmission or reception of the optical signal.

The claw 510 further includes at least one hook 511. The at least one hook 511 is disposed on a side surface connected to the first side surface 5101 and is configured to lock or unlock the external optical fiber 101.

The number and the setting mode of the hook 511 are not limited in the present disclosure, and the number of the hook 511 may be one, two or more. In a case where the number of the hook 511 is one, the hook 511 may be disposed on any side surface connected to the first side surface 5101. In a case where the number of the hook 511 is more than one, for example two, the two hooks 511 may be disposed on two opposite side surfaces connected to the first side surface 5101.

Figure 28:
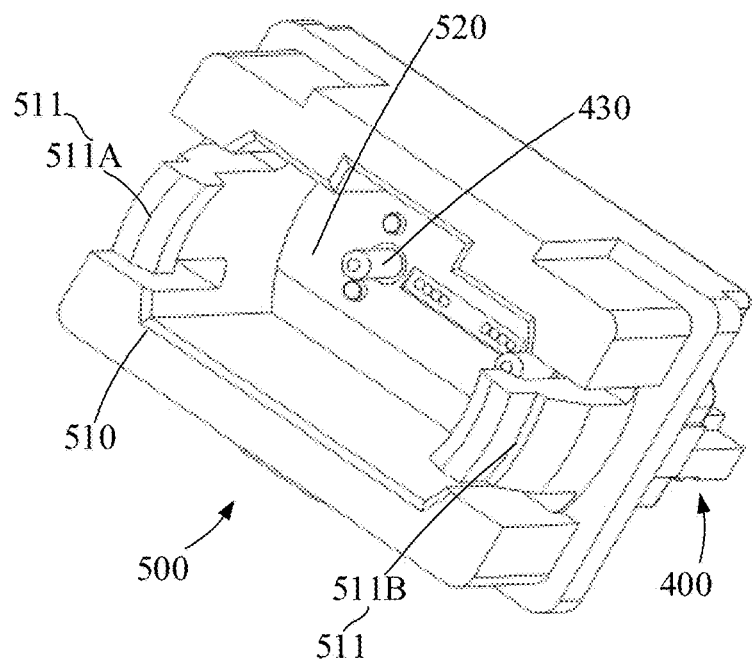
FIG. 28 is an assembly structural diagram of a lens assembly and a claw assembly, in accordance with some embodiments.

For example, as shown in FIGS. 14 and 28, the claw 510 includes two hooks 511, which are a first hook 511A and a second hook 511B, respectively. The first hook 511A is disposed on the third side surface 5103, and the second hook 511B is disposed on the fifth side surface 5105. The external optical fiber 101 is inserted into the through hole 514 of the claw 510, and the external optical fiber 101 is locked by the first hook 511A and the second hook 511B, so as to ensure an installation stability of the external optical fiber 101. Similarly, when the external optical fiber 101 needs to be removed, the external optical fiber 101 and the claw 510 may be separated by pressing the first hook 511A and the second hook 511B.

When the claw 510 is connected to the lens assembly 400, an electromagnetic wave generated by an operation of the optical module 200 are easily leaked out through the through hole 514 of the claw 510, causing electromagnetic interference to a communication device outside the optical module 200, so that a shield may be provided between the lens assembly 400 and the claw 510 to shield the electromagnetic wave generated by the optical module 200. In some embodiments of the present disclosure, the claw assembly 500 further includes a shielding plate 520. The shielding plate 520 is disposed between the claw 510 and the lens assembly 400, and is connected to the claw 510. The shielding plate 520 is configured to shield the electromagnetic wave generated by the optical module 200. The shielding plate 520 may be made of the metal material.

Figure 15:
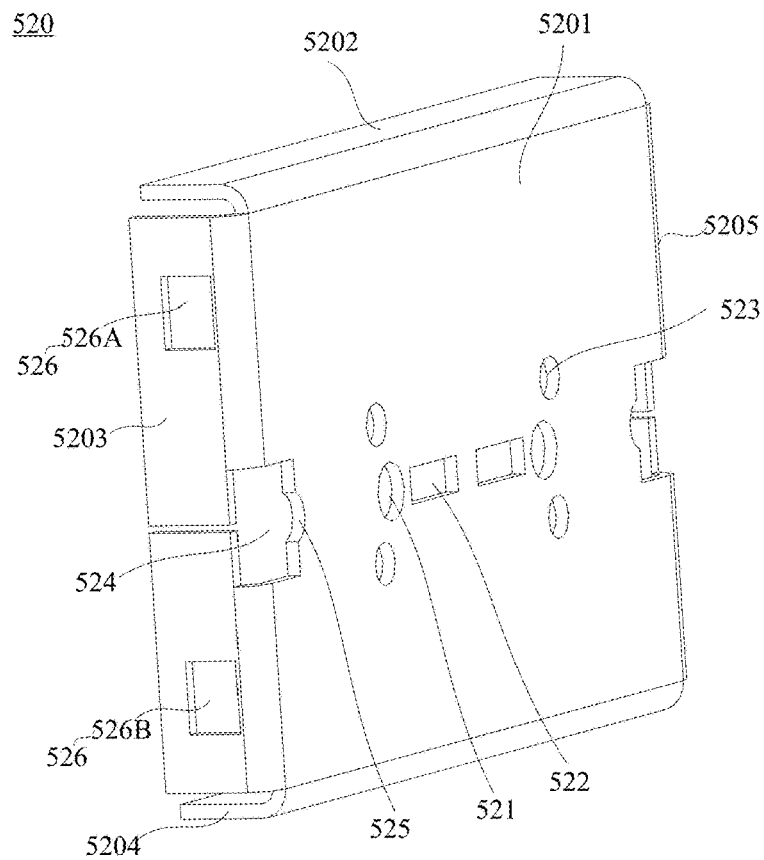
FIG. 15 is a structural diagram of a shielding plate in an optical module, in accordance with some embodiments.
Figure 16:
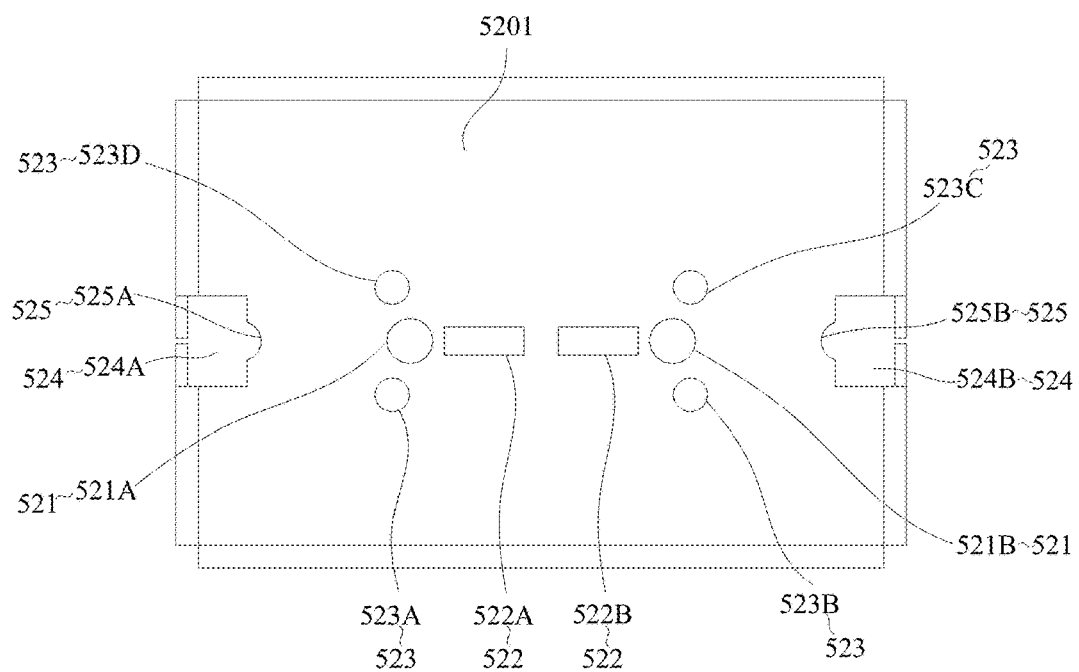
FIG. 16 is a structural diagram of a shielding plate in an optical module from another angle, in accordance with some embodiments.

FIG. 15 is a structural diagram of the shielding plate 520 in an optical module in accordance with some embodiments, and FIG. 16 is a structural diagram of the shielding plate 520 in an optical module from another angle in accordance with some embodiments. As shown in FIGS. 15 and 16, the shielding plate 520 is a case with one end open, which includes a first side plate 5201, a second side plate 5202, a third side plate 5203, a fourth side plate 5204, and a fifth side plate 5205 which are connected to the first side plate 5201. The first side plate 5201 faces the lens assembly 400, the second side plate 5202 is disposed opposite to the fourth side plate 5204, and the third side plate 5203 is disposed opposite to the fifth side plate 5205. The shielding plate 520 is covered on the first side surface 5101 of the claw 510 facing the lens assembly 400. That is, the first side plate 5201, the second side plate 5202, the third side plate 5203, the fourth side plate 5204, and the fifth side plate 5205 respectively abut against the first side surface 5101, the second side surface 5102, the third side surface 5103, the fourth side surface 5104, and the fifth side surface 5105 of the claw 510, so that the first side plate 5201 blocks the through hole 514 of the claw 510 to prevent the electromagnetic wave inside the optical module 200 from leaking out through the through hole 514.

Figure 17:
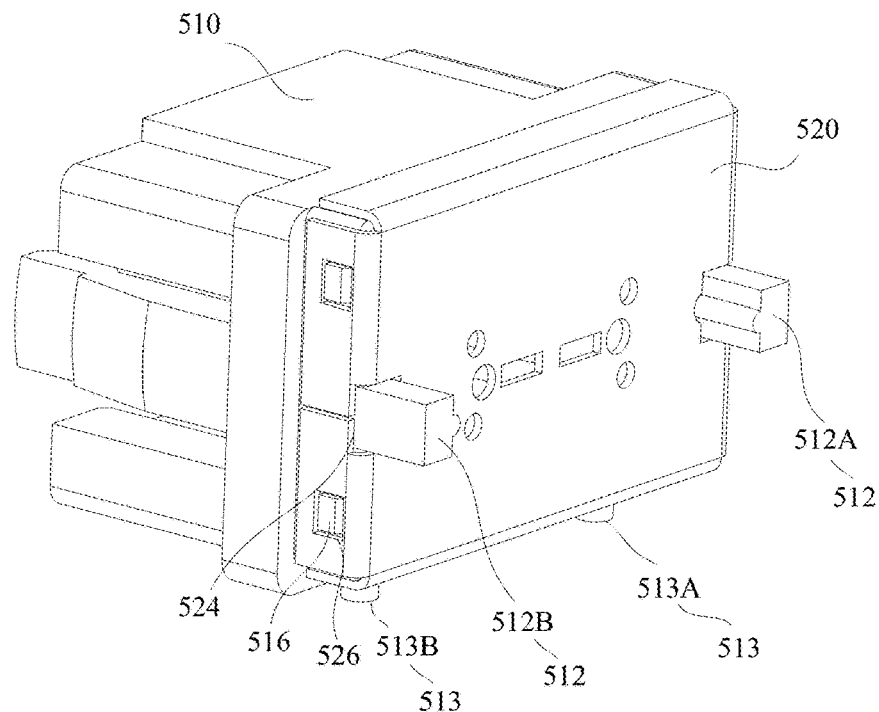
FIG. 17 is an assembly diagram of a claw and a shielding plate in an optical module, in accordance with some embodiments.

FIG. 17 is an assembly diagram of the claw 510 and the shielding plate 520 in an optical module in accordance with some embodiments. As shown in FIG. 17, in order to realize a connection between the claw 510 and the shielding plate 520, the shielding plate 520 includes at least one positioning through hole 524 corresponding to the at least one positioning protrusion 512, and the at least one positioning through hole 524 is disposed on the first side plate 5201. When the shielding plate 520 is assembled with the claw 510, the positioning protrusion 512 passes through the corresponding positioning through hole 524, so that the shielding plate 520 can be connected to the claw 510.

For example, as shown in FIG. 16, the shielding plate 520 includes two positioning through holes 524, which are a first positioning through hole 524A and a second positioning through hole 524B, respectively, and the two positioning through holes 524 are disposed on the first side plate 5201. When the shielding plate 520 is covered on the claw 510, the first positioning protrusion 512A passes through the first positioning through hole 524A, the second positioning protrusion 512B passes through the second positioning through hole 524B, and the shielding plate 520 moves along the positioning protrusion 512 toward the claw 510 until an inner surface of the first side plate 5201 of the shielding plate 520 abuts against the first side surface 5101 of the claw 510, thereby realizing the connection between the shielding plate 520 and the claw 510.

When the claw 510 includes the limiting protrusion 517, the shielding plate 520 further includes at least one limiting through hole 525 in one-to-one correspondence to the at least one limiting protrusion 517, and the at least one limiting through hole 525 is disposed on the first side plate 5201, and communicates with a corresponding positioning through hole 524. When the shielding plate 520 is assembled with the claw 510, the limiting protrusion 517 passes through the corresponding limiting through hole 525, so that the shielding plate 520 may be connected to the claw 510.

For example, as shown in FIG. 9, the shielding plate 520 includes two limiting through holes 525, which are a first limiting through hole 525A and a second limiting through hole 525B, respectively, and the two limiting through holes 525 are disposed on the first side plate 5201. The first limiting through hole 525A communicates with the first positioning through hole 524A, and the second limiting through hole 525B communicates with the second positioning through hole 524B.

When the shielding plate 520 is covered on the claw 510, the first positioning protrusion 512A and the first limiting protrusion 517A respectively pass through the first positioning through hole 524A and the first limiting through hole 525A, and the second positioning protrusion 512B and the second limiting protrusion 517B respectively pass through the second positioning through hole 524B and the second limiting through hole 525B. The shielding plate 520 moves along the positioning protrusion 512 and the limiting protrusion 517 toward the claw 510 until the inner surface of the first side plate 5201 of the shielding plate 520 abuts against the first side surface 5101 of the claw 510, thereby realizing the connection between the shielding plate 520 and the claw 510.

In order to realize a fixing of the claw 510 and the shielding plate 520, the claw 510 includes at least one fixing boss 516, and the at least one fixing boss 516 is disposed on side surfaces connected to the first side surface 5101.

The number and arrangement of the fixing boss 516 are not limited in the present disclosure, and the number of the fixing boss 516 may be one, two or more. In a case where the number of the fixing boss 516 is one, the fixing boss 516 may be disposed on any side surface connected to the first side surface 5101; in a case where the number of the fixing boss 516 is more than one, for example two, the two fixing bosses 516 may be disposed on two opposite side surfaces connected to the first side surface 5101.

For example, as shown in FIG. 14, the claw 510 includes four fixing bosses 516, which are a first fixing boss 516A, a second fixing boss 516B, a third fixing boss and a fourth fixing boss, respectively. The first fixing boss 516A and the second fixing boss 516B are disposed on the third side surface 5103 and are spaced apart along a direction perpendicular to the second side surface 5102 and the fourth side surface 5104. The third fixing boss and the fourth fixing boss are disposed on the fifth side surface 5105, and are spaced apart along the direction perpendicular to the second side surface 5102 and the fourth side surface 5104.

On this basis, the shielding plate 520 includes at least one fixing hole 526 in one-to-one correspondence to the at least one fixing boss 516, and the at least one fixing hole 526 is disposed on side plates connected to the first side plate 5201. The fixing boss 516 is clamped with the corresponding fixing hole 526, so as to realize the fixing of the claw 510 and the shielding plate 520.

For example, as shown in FIG. 15, the shielding plate 520 includes four fixing holes 526, which are a first fixing hole 526A, a second fixing hole 526B, a third fixing hole, and a fourth fixing hole, respectively. The first fixing hole 526A and the second fixing hole 526B are disposed on the third side plate 5203, and are spaced apart along a direction perpendicular to the second side plate 5202 and the fourth side plate 5204. The third fixing hole and the fourth fixing hole are disposed on the fifth side plate 5205, and are spaced apart along the direction perpendicular to the second side plate 5202 and the fourth side plate 5204.

When the shielding plate 520 is covered on the claw 510, the first fixing boss 516A and the second fixing boss 516B are respectively clamped into the first fixing hole 526A and the second fixing hole 526B, and the third fixing boss and the fourth fixing boss are respectively clamped into the third fixing hole and the fourth fixing hole, so that the claw 510 is fixed to the shielding plate 520.

A surface of the fixing boss 516 facing the shielding plate 520 is a first surface 5161, a surface connected to the first surface 5161 and opposite to a side surface where the fixing boss 516 is located is a second surface 5162, and a surface opposite to the first surface 5161 is a third surface 5163. In order to facilitate the fixing bosses 516 on the claw 510 to be clamped into the corresponding fixing holes 526 on the shielding plate 520, the first surface 5161 of the fixing boss 516 is disposed as an inclined surface, that is, the first surface 5161 is not perpendicular to the second surface 5162. An included angle between the first surface 5161 and the second surface 5162 is an obtuse angle, that is, along a direction perpendicular to the second surface 5162 and pointing to the side surface where the fixing boss 516 is located, a distance between the first surface 5161 and the third surface 5163 is gradually increased. In this way, when the fixing boss 516 is locked into the corresponding fixing hole 526, an arrangement of the inclined surface 5161 is beneficial for the fixing holes 526 on the shielding plate 520 to be sleeved on the corresponding fixing bosses 516, so that the fixing holes 526 are clamped with the corresponding fixing bosses 516 along the inclined surface 5161, the fixing of the claw 510 and the shielding plate 520 is realized.

In order to enable an optical signal to be transmitted between the external optical fiber 101 and the lens assembly 400, the shielding plate 520 further includes at least one light-passing hole 522 disposed on the first side plate 5201. The light-passing hole 522 corresponds to a position of the second lens array 421, and is configured to transmit the light carrying information between the external optical fiber 101 and the lens assembly 400. The number of the light-passing hole 522 is not limited in the present disclosure, which may be one, two or more.

For example, as shown in FIG. 16, the fixing plate 520 includes two light-passing holes 522 disposed on the first side plate 5201, which are a first light-passing hole 522A and a second light-passing hole 522B, respectively. The first light-passing hole 522A corresponds to a position of the second collimating lens 4212, and the second light-passing hole 522B corresponds to a position of the second focusing lens 4211. The light emitted by the light-transmitting chip 601 is emitted through the second focusing lens 4211 of the connecting part 420, and then enters the external optical fiber 101 in the claw 510 through the second light-passing hole 522B on the shielding plate 520 to realize light emission. The light from the external optical fiber 101 in the claw 510 passes through the first light-passing hole 522A on the shielding plate 520, enters the second collimating lens 4212 of the connecting part 420, and then is reflected into the light-receiving chip 602 to achieve light reception.

In some embodiments of the present disclosure, the claw 510 is fixed between the upper shell 201 and the lower shell 202. When the claw 510 and the shielding plate 520 are assembled and connected to the lens assembly 400, the electromagnetic wave generated by the operation of the optical module 200 may leak out from assembly gaps between the claw 510 and the upper shell 201, and between the claw 510 and the lower shell 202. Therefore, the claw assembly 500 further includes a conductive rubber strip 530, which is sleeved on outer periphery of the shielding plate 520, that is, four inner surfaces of the conductive rubber strip 530 respectively abut against the second side plate 5202, the third side plate 5203, the fourth side plate 5204, and the fifth side plate 5205 of the shield plate 520, and outer side surfaces of the conductive rubber strip 530 abuts against inner side surfaces of the upper shell 201 and the lower shell 202 respectively, so as to seal the assembly gaps between the claw 510 and the upper shell 201, and between the claw 510 and the lower shell 202. In this way, the conductive rubber strip 530 may shield the electromagnetic wave which is intended to leak from the assembly gaps between the claw 510 and the upper shell 201, and between the claw 510 and the lower shell 202, thereby improving an electromagnetic shielding performance of the optical module 200.

Figure 18:
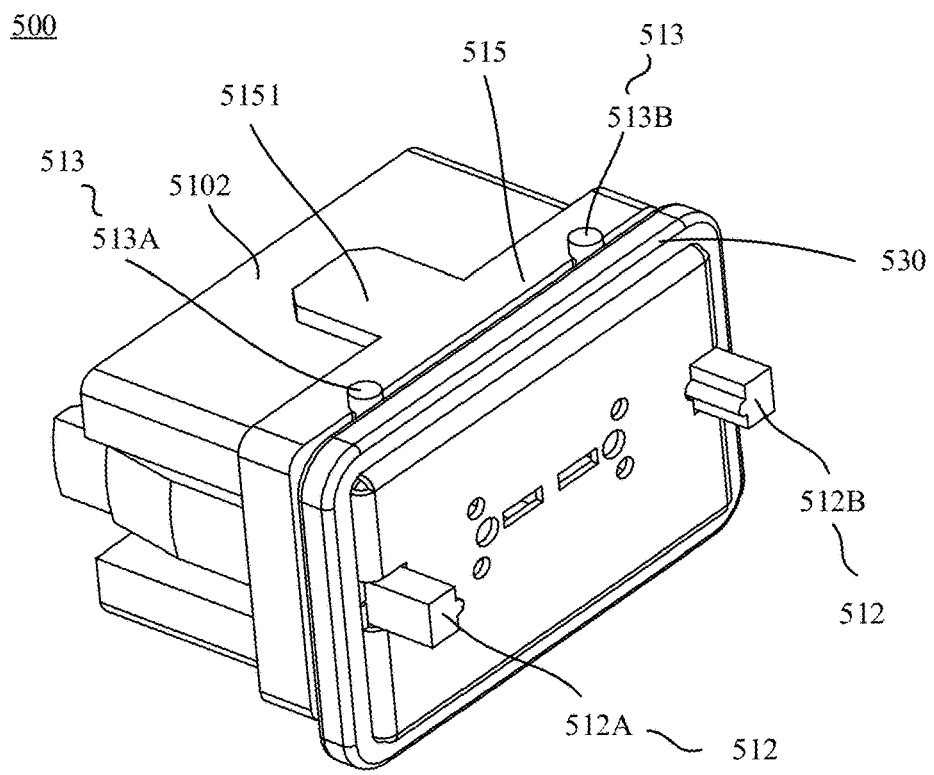
FIG. 18 is a structural diagram of a claw assembly in an optical module, in accordance with some embodiments.

In some embodiments of the present disclosure, an assembly process of the claw assembly 500 is as follows: firstly, the positioning through hole 524 and the limiting through hole 525 on the first side plate 5201 of the shielding plate 520 are respectively aligned with the positioning protrusion 512 and the limiting protrusion 517 on the first side surface 5101 of the claw 510, and then the positioning protrusion 512 and the limiting protrusion 517 are respectively passed into the corresponding positioning through hole 524 and the limiting through hole 525; then the shielding plate 520 moves toward the claw 510 until the inner surface of the first side plate 5201 of the shield plate 520 abuts against the first side surface 5101 of the claw 510; simultaneously, the fixing bosses 516 on the third side surface 5103 and the fifth side surface 5105 of the claw 510 are respectively clamped into the fixing holes 526 on the third side plate 5203 and the fifth side plate 5205 of the shielding plate 520 to realize the fixing of the claw 510 and the shielding plate 520 (as shown in FIG. 17); then the conductive rubber strip 530 is sleeved on outer peripheries of the second side plate 5202, the third side plate 5203, the fourth side plate 5204, and the fifth side plate 5205 of the shielding plate 520 (as shown in FIG. 18).

Figure 19:
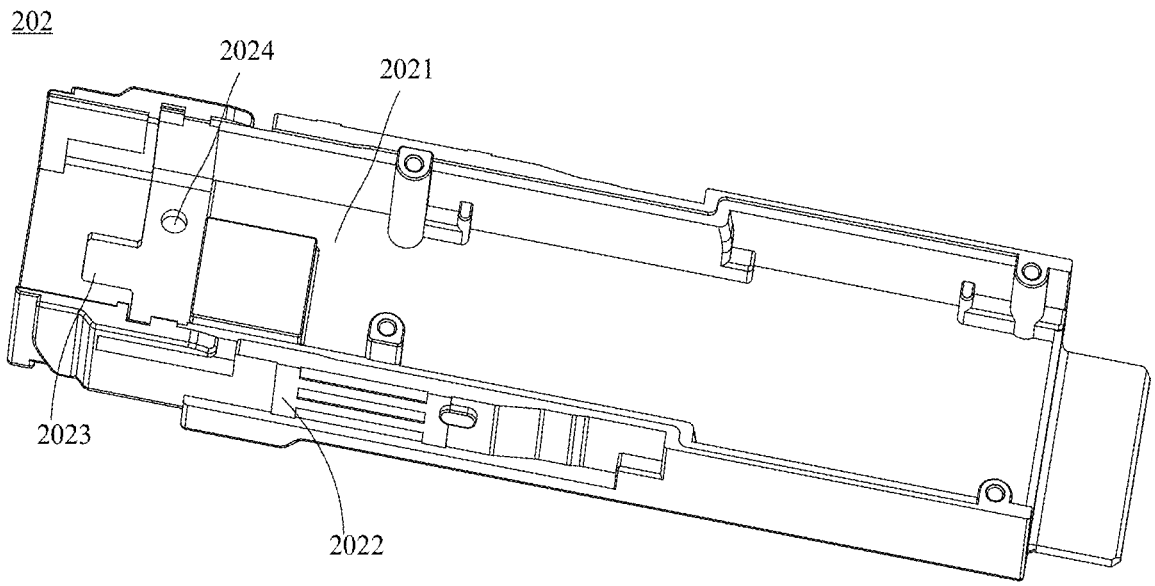
FIG. 19 is a structural diagram of a lower shell in an optical module, in accordance with some embodiments.
Figure 20:
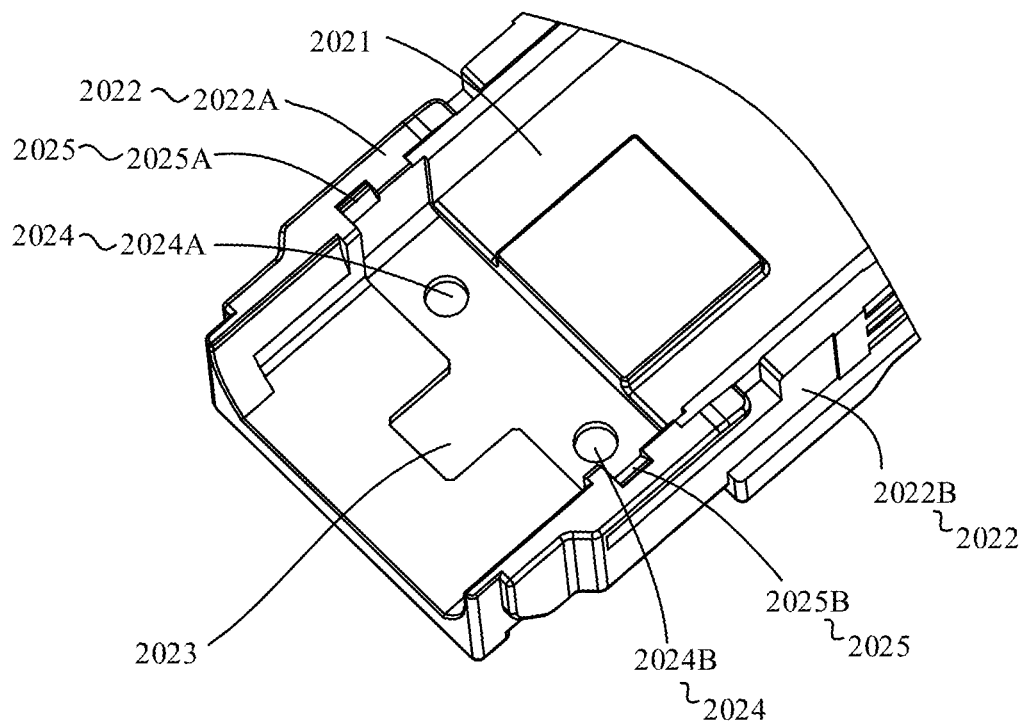
FIG. 20 is a partial structural diagram of a lower shell in an optical module from another angle, in accordance with some embodiments.

FIG. 18 is a structural diagram of the claw assembly 500 in an optical module in accordance with some embodiments, FIG. 19 is a structural diagram of the lower shell 202 in an optical module in accordance with some embodiments, and FIG. 20 is a structural diagram of the lower shell 202 in an optical module from another angle in accordance with some embodiments. As shown in FIGS. 18 to 20, the claw 510 further includes a limiting boss 515 disposed on an outer periphery of the claw 510, and the limiting boss 515 is proximate to the first side surface 5101 of the claw 510. The claw 510 further includes a first limiting boss 5151 disposed on the second side surface 5102, and the first limiting boss 5151 abuts against the limiting boss 515.

The lower shell 202 includes a first limiting groove 2023 disposed on the bottom plate 2021 and located on a side of the bottom plate 2021 proximate to the claw 510. When the claw assembly 500 is disposed on the lower shell 202, the first limiting boss 5151, a portion of the limiting boss 515 located on the second side surface 5102, and a portion where the conductive rubber strip 530 abuts the second side plate 5202 are embedded in the first limiting groove 2023 on the lower shell 202, so as to limit the claw assembly 500, which prevents the claw assembly 500 from moving on the bottom plate 2021 of the lower shell 202.

In order to further improve the installation stability of the claw assembly 500 and the lower shell 202, the first limiting groove 2023 and the claw assembly 500 are bonded by glue. In order to be able to add glue into the first limiting groove 2023, the lower shell 202 includes two dispensing slopes 2025, which are a first dispensing slope 2025A and a second dispensing slope 2025B, respectively. The first dispensing slope 2025A is disposed on a first lower side plate 2022A, and the second dispensing slope 2025B is disposed on a second lower side plate 2022B.

The first dispensing slope 2025A is formed by obliquely cutting a surface of the first lower side plate 2022A away from the bottom plate 2021 along a direction pointing to the bottom plate 2021, and there is a gap between the third side surface 5103 of the claw 510 and an inner side wall of the first lower side plate 2022A. The second dispensing slope 2025B is formed by obliquely cutting a surface of the second lower side plate 2022B away from the bottom plate 2021 along a direction pointing to the bottom plate 2021, and there is a gap between the fifth side surface 5105 of the claw 510 and an inner side wall of the second lower side plate 2022B.

In this way, the glue may flow into the first limiting groove 2023 through the first dispensing slope 2025A and the second dispensing slope 2025B along the inner side walls of the first lower side plate 2022A and the second lower side plate 2022B, so as to bond and fix the claw assembly 500 and the lower shell 202.

Figure 21:
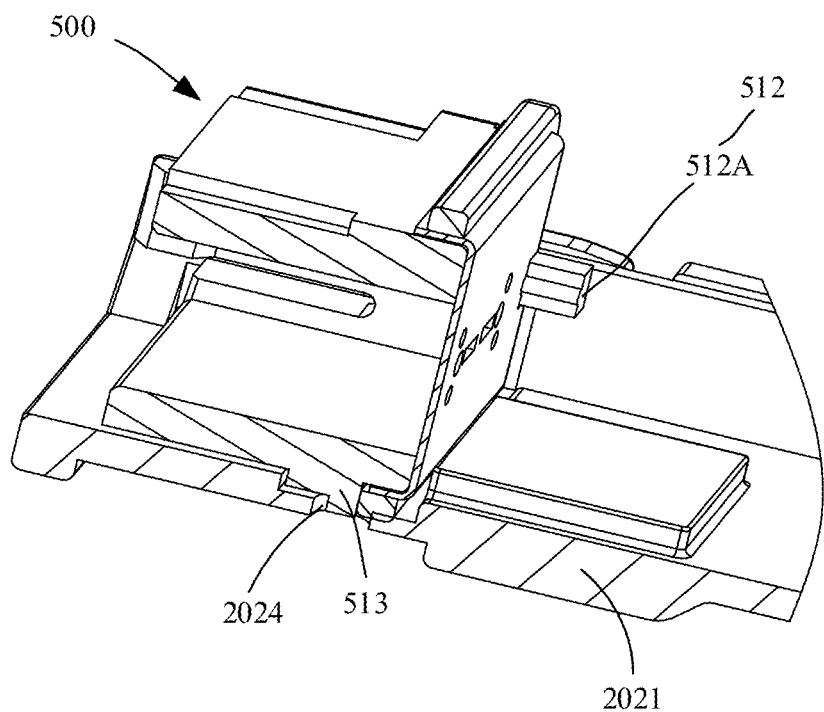
FIG. 21 is a partial assembly sectional view of a claw assembly and a lower shell in an optical module, in accordance with some embodiments.

FIG. 21 is a partial sectional view of the claw assembly 500 and the lower shell 202 in an optical module in accordance with some embodiments. As shown in FIGS. 18 to 21, in order to further fix the claw 510, the claw 510 further includes at least one positioning post 513. The at least one positioning post 513 is disposed on the second side surface 5102 and is located between the limiting boss 515 and the conductive rubber strip 530.

The number of the positioning post 513 is not limited in the present disclosure, which may be one, two or more. For example, as shown in FIG. 18, the claw 510 includes two positioning posts 513, which are respectively a first positioning post 513A and a second positioning post 513B. The two positioning posts 513 are both disposed on the second side surface 5102 and are located between the limiting boss 515 and the conductive rubber strip 530.

On this basis, the lower shell 202 further includes at least one positioning hole 2024 in one-to-one correspondence to the at least one positioning post 513, and the at least one positioning hole 2024 is disposed in the first limiting groove 2023. When the claw assembly 500 is fixed on the lower shell 202, the positioning post 513 of the claw 510 is inserted into the corresponding positioning hole 2024 of the lower shell 202, and the positioning post 513 cooperates with the positioning hole 2024 to realize a relative fixation between the claw assembly 500 and the lower shell 202.

For example, as shown in FIGS. 19 and 20, the lower shell 202 includes two positioning holes 2024, which are a first positioning hole 2024A and a second positioning hole 2024B, respectively. The two positioning holes 2024 are disposed in the first limiting groove 2023. When the claw assembly 500 is fixed to the lower shell 202, the first positioning post 513A is inserted into the first positioning hole 2024A, and the second positioning post 513B is inserted into the second positioning hole 2024B, thereby realizing the relative fixation between the claw assembly 500 and the lower shell 202.

In order to further improve the installation stability of the claw assembly 500 and the lower shell 202, after the first positioning post 513A and the second positioning post 513B are respectively inserted into the first positioning hole 2024A and the second positioning hole 2024B, the first positioning post 513A and the second positioning post 513B are respectively fixed in the first positioning hole 2024A and the second positioning hole 2024B by dispensing glue.

In some embodiments of the present disclosure, the claw 510 includes the positioning holes disposed on the second side surface 5102, and the lower shell 202 includes the positioning posts disposed on the bottom plate 2021 and corresponding to positions of the positioning holes, so that a fixed connection between the claw assembly 500 and the lower shell 202 is realized through the positioning posts of the lower shell 202 and the positioning holes of the claw 510.

Figure 22:
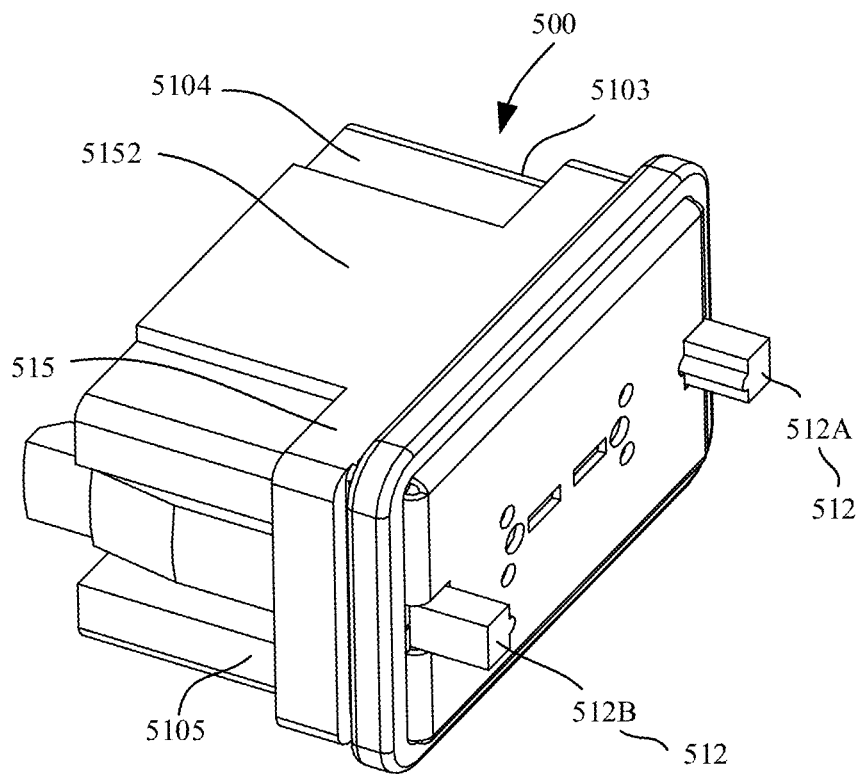
FIG. 22 is a structural diagram of a claw assembly in an optical module from another angle, in accordance with some embodiments.
Figure 23:
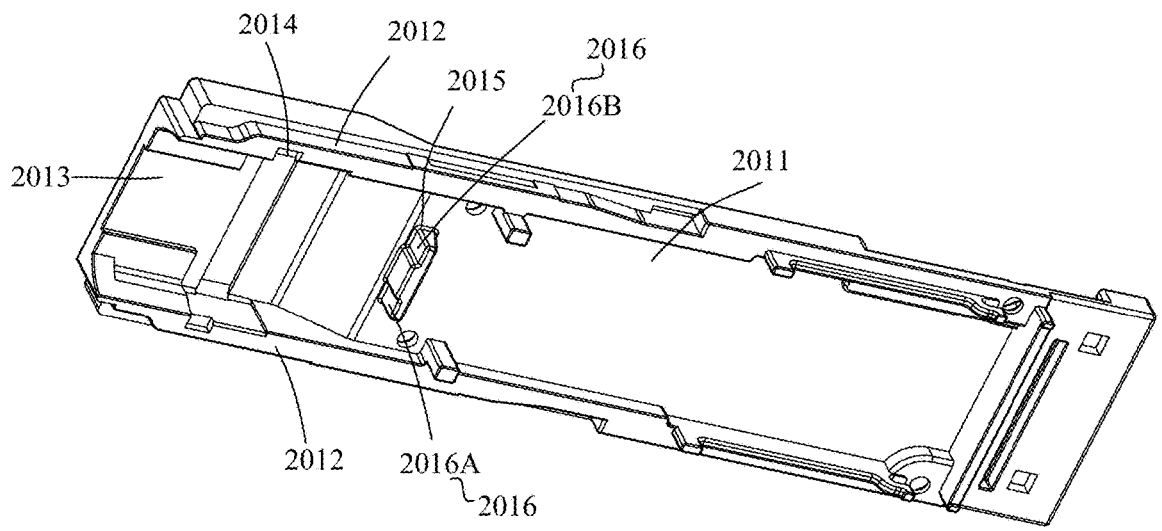
FIG. 23 is a structural diagram of an upper shell of an optical module, in accordance with some embodiments.
Figure 24:
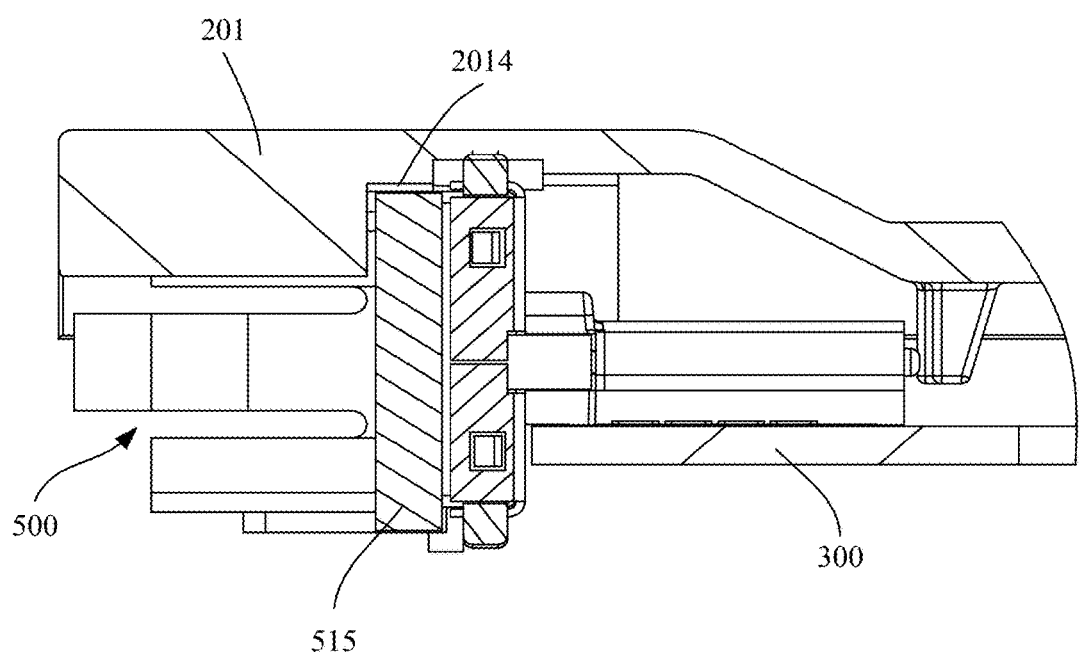
FIG. 24 is a partial assembly sectional view of an upper shell, a lens assembly, a circuit board, and a claw assembly in an optical module, in accordance with some embodiments.

FIG. 22 is a structural diagram of the claw assembly 500 in an optical module from another angle in accordance with some embodiments, FIG. 23 is a structural diagram of the upper shell 201 in an optical module in accordance with some embodiments, and FIG. 24 is a partial sectional view of an optical module in accordance with some embodiments. As shown in FIGS. 22 to 24, the claw 510 includes a second limiting boss 5152 disposed on the fourth side surface 5104, and the second limiting boss 5152 is connected to the limiting boss 515. The upper shell 201 includes a second limiting groove 2013 disposed on the cover plate 2011 and located on a side of the cover plate 2011 proximate to the claw assembly 500. When the upper shell 201 is covered on the lower shell 202, the second limiting boss 5152 and a portion of the limiting boss 515 located on the fourth side surface 5104 are embedded in the second limiting groove 2013 of the upper shell 201.

In some embodiments of the present disclosure, the upper shell 201 includes two clamping grooves 2014, and the two clamping grooves 2014 are respectively disposed on two opposite upper side plates 2012. Portions of the limiting boss 515 located on the third side surface 5103 and the fifth side surface 5105 are respectively clamped into the two clamping grooves 2014, and an end surface of the limiting boss 515 facing the first side surface 5101 abuts against the two clamping grooves 2014, so as to limit the claw assembly 500, which prevents the claw assembly 500 from moving on the upper shell 201.

In some embodiments of the present disclosure, when the claw assembly 500 and the lens assembly 400 are installed, the claw assembly 500 needs to be inserted into the lens assembly 400. In this case, the lens assembly 400 may be displaced during the installation process. For this purpose, the upper shell 201 includes a limiting protrusion 2015 disposed on the cover plate 2011, and the limiting protrusion 2015 abuts against an end surface of the lens assembly 400 away from the claw assembly 500. When the lens assembly 400 moves along a direction away from the claw assembly 500, the limiting protrusion 2015 may support the lens assembly 400 at a tail end of the lens assembly 400, that is, an end away from the claw assembly 500, so as to prevent the lens assembly 400 from being forced to move in the direction away from the claw assembly 500 and falling off.

Figure 26:
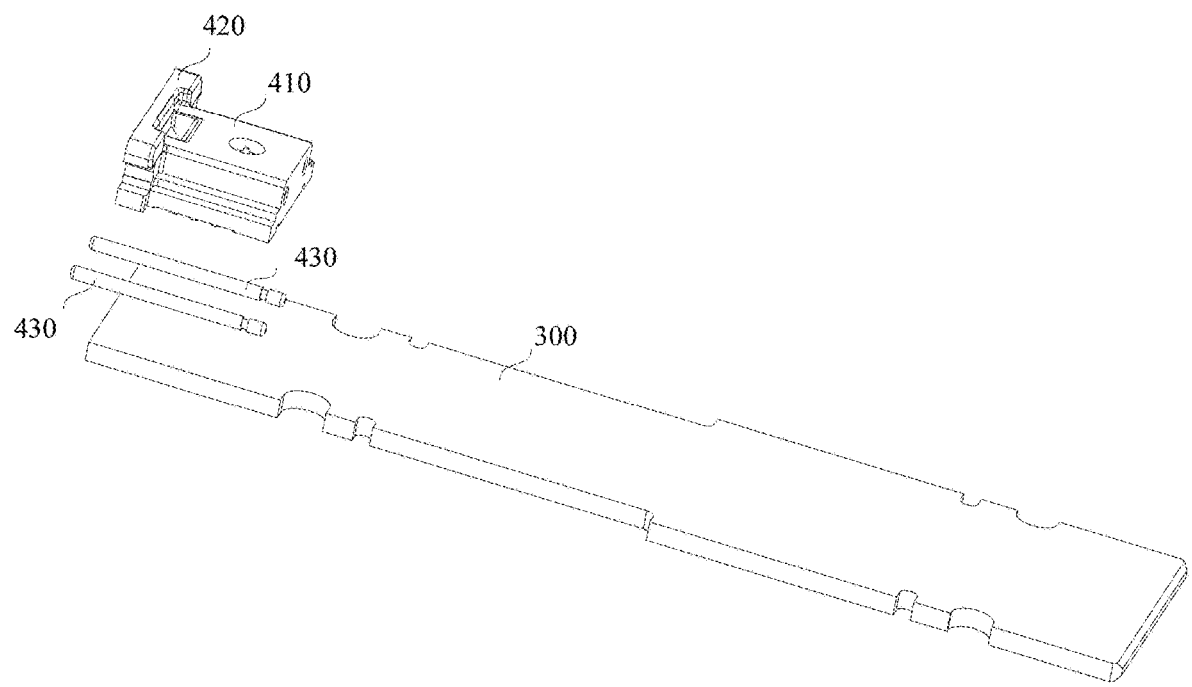
FIG. 26 is an exploded view of a lens assembly and a circuit board, in accordance with some embodiments.
Figure 27:
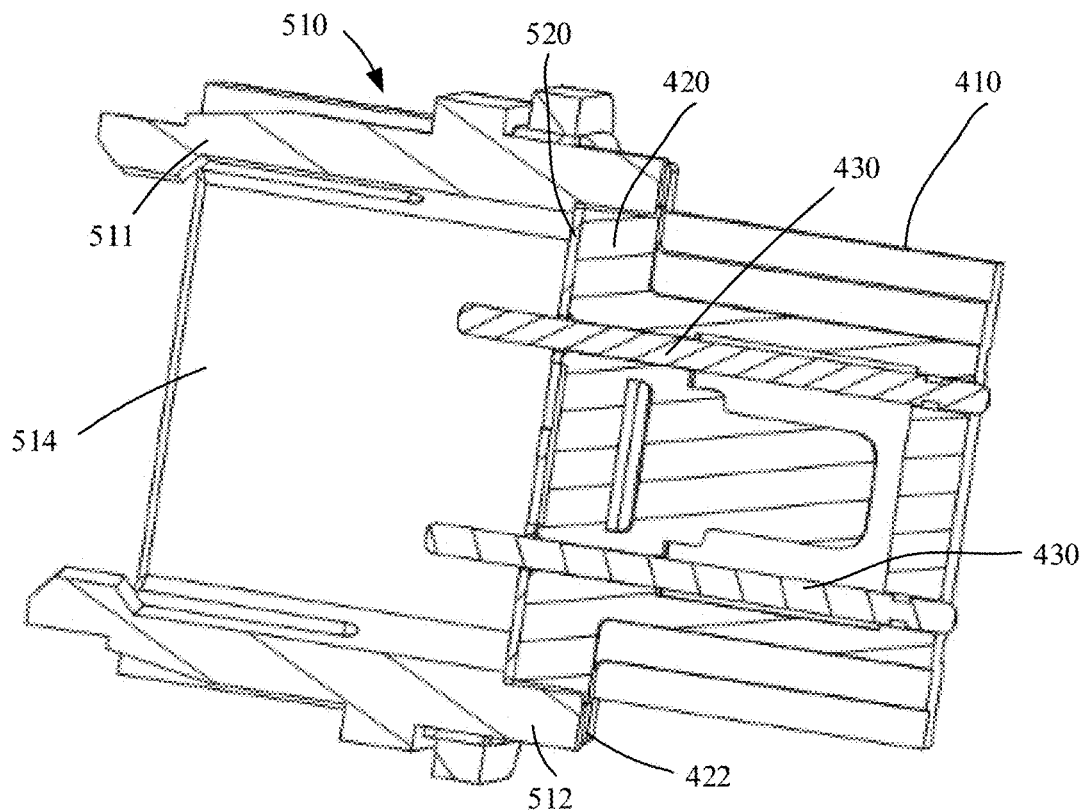
FIG. 27 is an assembly sectional view of a lens assembly and a claw assembly in an optical module, in accordance with some embodiments.

In some embodiments of the present disclosure, as shown in FIGS. 26 and 27, the lens assembly 400 further includes at least one positioning pin 430. The positioning pin 430 is inserted into the through hole 514 of the claw 510 after sequentially passing through the lens base 410, the connecting part 420, and the shielding plate 520, and is connected to the external optical fiber 101. The number of the positioning pin 430 is not limited in the present disclosure, which may be one, two or more. For example, as shown in FIG. 8, the lens assembly 400 includes two positioning pins 430, which are a first positioning pin 430A and a second positioning pin 430B, respectively.

On this basis, as shown in FIG. 9, the lens base 410 includes at least one lens base through hole 414 in one-to-one correspondence to the at least one positioning pin 430, and the at least one lens base through hole 414 penetrates a surface of the lens base 410 facing the claw assembly 500 and a surface of the lens base 410 facing away from the claw assembly 500. As shown in FIG. 8, the connecting part 420 includes at least one connecting part through hole 424 in one-to-one correspondence to the at least one positioning pin 430, and the at least one connecting part through hole 424 penetrates a surface of the connecting part 420 facing the claw assembly 500 and a surface of the connecting part 420 facing away from of the claw assembly 500. The connecting part through hole 424 communicates with the corresponding lens base through hole 414, the positioning pin 430 sequentially penetrates the corresponding lens base through hole 414 and the connecting part through hole 424, and one end of the positioning pin 430 extends out of the surface of the connecting part 420 toward the claw assembly 500.

In some embodiments of the present disclosure, the lens base through hole 414 extends to an inside of the lens base 410 and does not penetrate the surface of the lens base 410 away from the claw assembly 500, for example, the lens base through hole 414 extends to communicate with the second groove 412.

In some embodiments of the present disclosure, in order to further improve an installation stability of the positioning pin 430, the positioning pin 430 is fixed in the corresponding connecting part through hole 424 and the lens base through hole 414 by dispensing glue. In order to facilitate the fixation of the positioning pin 430 by dispensing glue, an end of the connecting part through hole 424 and an end of the lens base through hole 414 are respectively provided with glue slots, and the glue is dispensed at the glue slots.

For example, the lens base 410 includes two lens base through holes 414, which are a first lens base through hole 414A and a second lens base through hole 414B, respectively. The two lens base through holes 414 both penetrate the surface of the lens base 410 facing the claw assembly 500 and the surface of the lens base 410 facing away from the claw assembly 500. The connecting part 420 includes two connecting part through holes 424, which are respectively a first connecting part through hole 424A and a second connecting part through hole 424B. The two connecting part through holes 424 both penetrate a surface of the connecting part 420 facing the claw assembly 500 and a surface of the connecting part 420 facing away from the claw assembly 500.

The first connecting part through hole 424A communicates with the first lens base through hole 414A, and the second connecting part through hole 424B communicates with the second lens base through hole 414B. The first positioning pin 430A passes through the first lens base through hole 414A and the first connecting part through hole 424A, and the second positioning pin 430B passes through the second lens base through hole 414B and the second connecting part through hole 424B. One end of the first positioning pin 430A and one end of the second positioning pin 430B protrude from the surface of the connecting part 420 toward the claw assembly 500.

Another end of the first positioning pin 430A and another end of the second positioning pin 430B may abut against the surface of the lens base 410 facing away from the claw assembly 500, or may extend out of the surface of the lens base 410 facing away from the claw assembly 500.

Figure 25:
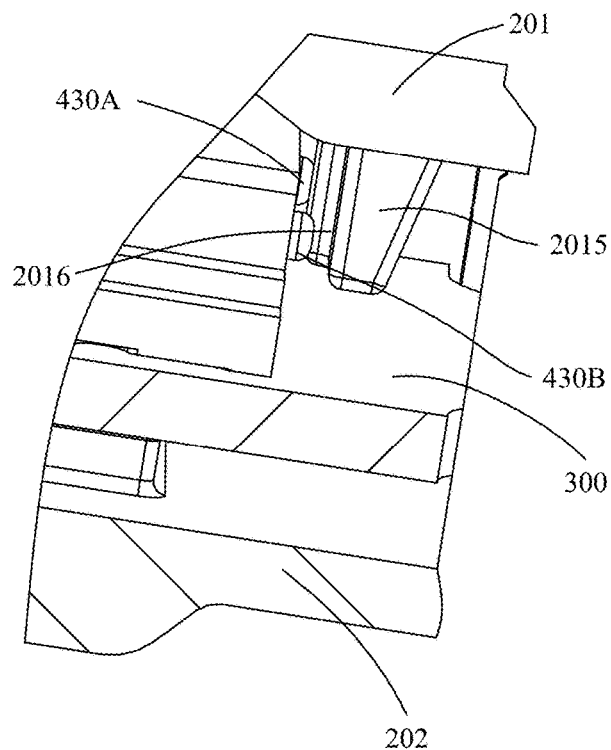
FIG. 25 is a partial assembly sectional view of an upper shell, a lens assembly, a circuit board, and a lower shell in an optical module from another angle, in accordance with some embodiments.

When one end of the first positioning pin 430A and one end of the second positioning pin 430B protrude out from the surface of the connecting part 420 toward the claw assembly 500, and another end of the first positioning pin 430A and another end of the second positioning pin 430B protrude out from the surface of the lens base 410 facing away from the claw assembly 500. As shown in FIGS. 23 and 25, the limiting protrusion 2015 includes two steps 2016, which are a first step 2016A and a second step 2016B, respectively. The first step 2016A is disposed on a surface of the limiting protrusion 2015 facing the lens assembly 400 and corresponds to a position of the first positioning pin 430A, and is configured to dodge the first positioning pin 430A. The second step 2016B is disposed on the surface of the limiting protrusion 2015 facing the lens assembly 400 and corresponds to a position of the second positioning pin 430B, and is configured to dodge the second positioning pin 430B.

When the lens assembly 400 moves in a direction away from the claw assembly 500, the first step 2016A may abut against a second end of the first positioning pin 430A, and the second step 2016B may abut against a second end of the second positioning pin 430B, so as to prevent the lens assembly 400 from being forced to continue to move in a direction away from the claw assembly 500 and causing the lens assembly 400 to fall off. It will be noted that an end of the positioning pin 430 protruding out from the surface of the lens assembly 400 facing the claw assembly 500 is a first end, and an end of the positioning pin 430 protruding away from the surface of the claw assembly 500 is a second end. In some embodiments of the present disclosure, in order to further ensure a strength and service life of the positioning pin 430, the positioning pin 430 may be made of a metal material with sufficient strength and corrosion resistance.

As shown in FIG. 16, the shielding plate 520 includes at least one positioning pin through hole 521 in one-to-one correspondence to the at least one positioning pin 430, and the at least one positioning pin through hole 521 is disposed on the first side plate 5201. The positioning pin 430 passes through the corresponding positioning pin through hole 521 and is inserted into the through hole 514 of the claw 510 to be connected to the external optical fiber 101, so as to position the external optical fiber 101.

For example, the shielding plate 520 includes two positioning pin through holes 521, which are respectively a first positioning pin through hole 521A and a second positioning pin through hole 521B, and the two positioning pin through holes 521 are both disposed on the first side plate 5201. When the lens assembly 400 is connected to the claw assembly 500, an end of the first positioning pin 430A protruding from the lens assembly 400 facing the surface of the claw assembly 500 passes through the first positioning pin through hole 521A, and an end of the second positioning pin 430B protruding from the surface of the lens assembly 400 facing the claw assembly 500 passes through the second positioning pin through hole 521B.

FIG. 27 is an assembly sectional view of the lens assembly 400 and the claw assembly 500 in an optical module in accordance with some embodiments. As shown in FIG. 27, after the first positioning pin 430A and the second positioning pin 430B respectively pass through the first positioning pin through hole 521A and the second positioning pin through hole 521B on the shielding plate 520, the first positioning pin 430A and the second positioning pin 430B are inserted into the through hole 514 of the claw 510 respectively, so as to position the external optical fiber 101 inserted into the claw 510 to realize an optical coupling between the external optical fiber 101 and the lens assembly 400.

The connecting part 420 further includes at least one positioning boss 423, and the at least one positioning boss 423 is disposed on the surface of the connecting part 420 facing the claw assembly 500 and extends toward the claw assembly 500. The number of the positioning boss 423 is not limited in the present disclosure, which may be one, two or more.

For example, as shown in FIG. 10, the connecting part 420 includes four positioning bosses 423, which are respectively a first positioning boss 423A, a second positioning boss 423B, a third positioning boss 423C, and a fourth positioning boss 423D. The four positioning bosses 423 are disposed on the surface of the connecting part 420 facing the claw assembly 500, arranged in a matrix of two rows and two columns, and extend toward the claw assembly 500.

On this basis, as shown in FIG. 16, the shielding plate 520 further includes at least one boss through hole 523 in one-to-one correspondence to the at least one positioning boss 423, and the at least one boss through hole 523 is disposed on the first side plate 5201. The positioning boss 423 passes through the corresponding boss through hole 523 and is inserted into the through hole 514 of the claw assembly 500.

For example, as shown in FIG. 16, the shielding plate 520 includes four boss through holes 523, which are respectively a first boss through hole 523A, a second boss through hole 523B, a third boss through hole 523C, and a fourth boss through hole 523D. The first positioning boss 423A passes through the first boss through hole 523A, the second positioning boss 423B passes through the second boss through hole 523B, the third positioning boss 423C passes through the third boss through hole 523C, and the fourth positioning boss 423D passes through the fourth boss through hole 523D, and the four positioning bosses 423 are inserted into the through hole 514 of the claw assembly 500 to support the external optical fiber 101 inserted into the claw 510.

In some embodiments of the present disclosure, cross-sectional shapes of the first positioning pin 430A and the second positioning pin 430B of the lens assembly 400 may both be circular. Accordingly, the first positioning pin through hole 521A and the second positioning through holes 521B of the shielding plate 520 both are circular holes.

Cross-sectional shapes of the first positioning boss 423A, the second positioning boss 423B, the third positioning boss 423C, and the fourth positioning boss 423D of the connecting part 420 may all be circular. Accordingly, the first boss through hole 523A, the second boss through hole 523B, the third boss through hole 523C, and the fourth boss through hole 523D are all circular holes.

Figure 29:
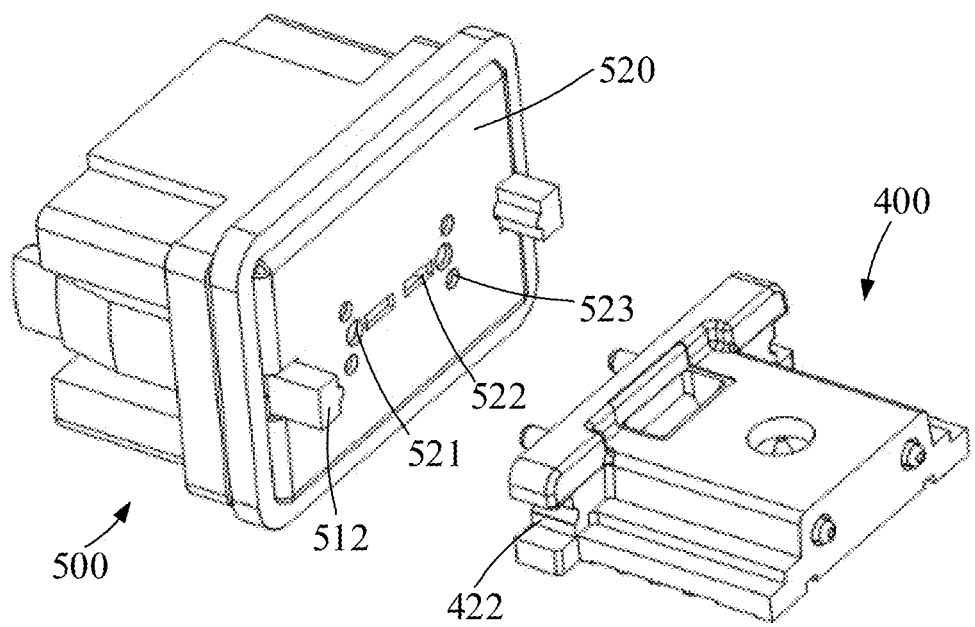
FIG. 29 is an exploded view of a lens assembly and a claw assembly, in accordance with some embodiments.
Figure 30:
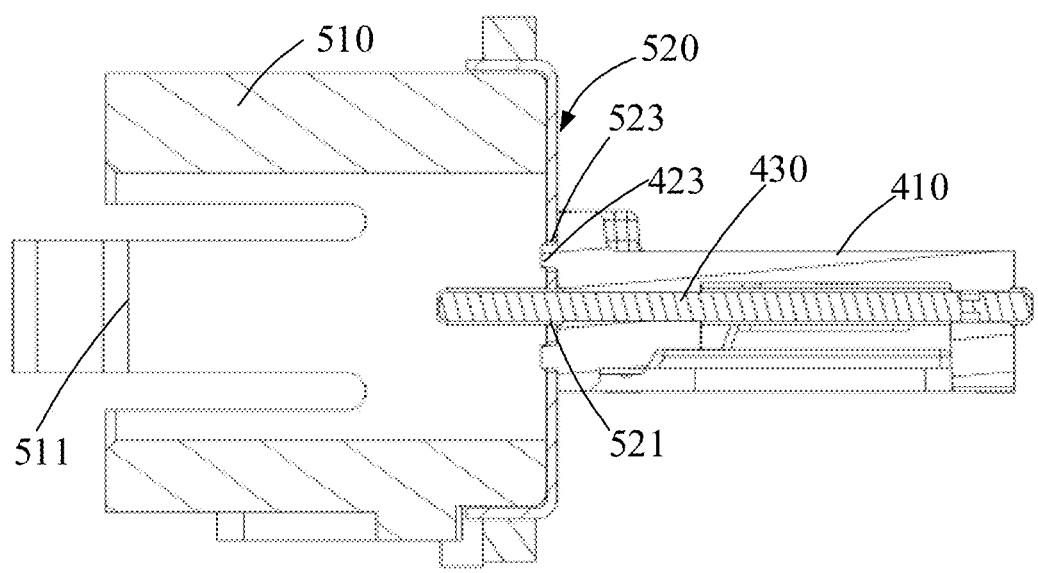
FIG. 30 is a sectional view of a lens assembly and a claw, in accordance with some embodiments.

In some embodiments of the present disclosure, as shown in FIGS. 29 and 30, an installation process of the lens assembly 400 and the claw assembly 500 is as follows: firstly, the lens assembly 400 is fixed to one end of the circuit board 300, and the claw assembly 500 is assembled; then the first positioning pin 430A and the second positioning pin 430B are inserted into the first positioning pin through hole 521A and the second positioning pin through hole 521B of the shielding plate 520, respectively, and then the claw assembly 500 is moved toward the lens assembly 400, until the positioning protrusion 512 of the claw assembly 500 is inserted into the corresponding positioning slot 422 of the connecting part 420, the first positioning boss 423A, the second positioning boss 423B, the third positioning boss 423C and the fourth positioning boss 423D of the connecting part 420 are respectively inserted into the first boss through hole 523A, the second boss through hole 523B, the third boss through hole 523C, and the fourth boss through hole 523D, so as to realize a fixed connection between the claw assembly 500 and the lens assembly 400.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the scope of the present disclosure shall be subject to the protection scope of the claims.

What is claimed is:

1. An optical module, comprising:
   a shell;
   a circuit board disposed in the shell;
   at least one of a light-transmitting chip or a light-receiving chip disposed on the circuit board and electrically connected to the circuit board; the light-transmitting chip being configured to generate an optical signal, and the light-receiving chip being configured to receive an optical signal from an outside of the optical module;
   a lens assembly disposed on the circuit board, wherein the lens assembly and the circuit board forming an accommodating cavity in which the at least one of the light-transmitting chip or the light-receiving chip is disposed, wherein the lens assembly comprises:

a lens base which covers the at least one of the light-transmitting chip or the light-receiving chip, and is configured to change a propagation direction of an optical signal incident into the lens assembly; and a connecting part which includes at least one positioning slot disposed on a surface of the connecting part facing away from the lens base; and a claw assembly optically connected to the lens assembly, wherein the claw assembly comprises:

a claw which includes at least one positioning protrusion disposed on a surface of the claw facing the connecting part, and the at least one positioning protrusion being inserted into a corresponding positioning slot; and a through hole penetrating a surface of the claw facing the lens assembly and a surface of the claw facing away from the lens assembly, and the through hole being configured to be connected to an optical fiber outside the optical module;

wherein the claw includes:

a first positioning protrusion disposed on a side of the surface of the claw facing the connecting part and extending toward the connecting part; and a second positioning protrusion disposed on another side of the surface of the claw facing the connecting part and extending toward the connecting part;

the connecting part includes:

a first positioning slot disposed on a surface of the connecting part facing the claw and corresponding to a position of the first positioning protrusion; and a second positioning slot disposed on the surface of the connecting part facing the claw and corresponding to a position of the second positioning protrusion;

wherein the first positioning protrusion is inserted into the first positioning slot, and the second positioning protrusion is inserted into the second positioning slot.

2. The optical module according to claim 1, wherein the claw further includes:

a first limiting protrusion disposed on the first positioning protrusion; and a second limiting protrusion disposed on the second positioning protrusion;

the connecting part further includes:

a first limiting slot disposed on the surface of the connecting part facing the claw, the first limiting slot corresponding to a position of the first limiting protrusion and being communicated with the first positioning slot; and a second limiting slot disposed on the surface of the connecting part facing the claw, the second limiting slot corresponding to a position of the second limiting protrusion and being communicated with the second positioning slot;

wherein the first limiting protrusion is inserted into the first limiting slot, and the second limiting protrusion is inserted into the second limiting slot.

3. The optical module according to claim 1, wherein the claw assembly further includes a shielding plate, the shielding plate is connected to the claw;

the shielding plate includes:

a first side plate facing the lens assembly;

a first positioning through hole disposed on the first side plate, and the first positioning through hole corresponding to the position of the first positioning protrusion; and a second positioning through hole disposed on the first side plate, and the second positioning through hole corresponding to the position of the second positioning protrusion;

wherein the first positioning protrusion passes through the first positioning through hole, and the second positioning protrusion passes through the second positioning through hole.

4. The optical module according to claim 3, wherein the shielding plate further includes a light-passing hole disposed on the first side plate, and optical signals from the lens assembly or the outside of the optical module are configured to pass through the light-passing hole.

5. The optical module according to claim 3, wherein the claw further includes a fixing boss, the shielding plate includes a fixing hole corresponding to the fixing boss, and the fixing boss is clamped with the fixing hole.

6. The optical module according to claim 5, wherein the fixing boss includes:

a first surface facing the first side plate of the shielding plate; and a second surface connected to the first surface and being opposite to a side surface of the claw where the fixed boss is located;

wherein the first surface is an inclined surface, and an included angle between the first surface and the second surface being an obtuse angle.

7. The optical module according to claim 3, wherein the connecting part further includes a positioning boss, and the positioning boss is disposed on a surface of the connecting part facing the claw assembly and extends toward the claw assembly;

the shielding plate includes a boss through hole, and the boss through hole is disposed on the first side plate and corresponds to a position of the positioning boss; and the positioning boss passes through the boss through hole to be inserted into the through hole of the claw.

8. The optical module according to claim 3, wherein the claw assembly further includes a conductive rubber strip, and the conductive rubber strip is sleeved on a periphery of the shielding plate.

9. The optical module according to claim 1, wherein the shell includes a lower shell, the lower shell includes a bottom plate and a first limiting slot disposed on the bottom plate;

the claw further includes a limiting boss and a first limiting boss, the limiting boss is disposed around the claw, and the first limiting boss is disposed on a surface of the claw proximate to the bottom plate, and is connected to the limiting boss; and a portion of the limiting boss located on the surface of the claw proximate to the bottom plate and the first limiting boss are both embedded in the first limiting slot.

10. The optical module according to claim 9, wherein the claw further includes a positioning post, and the positioning post is disposed on the surface of the claw proximate to the bottom plate;

the lower shell further includes a positioning hole disposed on the bottom plate and corresponding to a position of the positioning post, and the positioning post is fixed in the positioning hole.

11. The optical module according to claim 10, wherein the lower shell further includes:

a first lower side plate connected to the bottom plate;

a second lower side plate connected to the bottom plate and disposed opposite to the first lower side plate;

a first dispensing slope disposed on the first lower side plate and communicating with the first limiting groove; and a second dispensing slope disposed on the second lower side plate and communicating with the first limiting groove.

12. The optical module according to claim 9, wherein the shell further includes an upper shell, and the upper shell covers on the lower shell;
the upper shell includes a cover plate and a second limiting groove disposed on the cover plate;
the claw further includes a second limiting boss, the second limiting boss is disposed on a surface of the claw proximate to the cover plate, and is connected to the limiting boss; and
a portion of the limiting boss located on the surface of the claw proximate to the cover plate and the second limiting boss are both embedded in the second limiting groove.

13. The optical module according to claim 12, wherein the upper shell further includes two upper side plates connected to the cover plate and disposed opposite to each other; wherein
the two upper side plates are both provided with a clamping groove, and the limiting boss is clamped with the clamping groove.

14. The optical module according to claim 12, wherein the upper shell further includes a limiting protrusion, the limiting protrusion is disposed on a surface of the cover plate proximate to the circuit board, and the limiting protrusion extends toward the circuit board and abuts against a surface of the lens assembly facing away from the claw assembly.

15. The optical module according to claim 1, wherein the lens assembly further includes a positioning pin;
the lens base includes a lens base through hole, the lens base through hole penetrates a surface of the lens base proximate to the claw assembly and a surface of the lens base facing away from the claw assembly;
the connecting part further includes a connecting part through hole, the connecting part through hole penetrates a surface of the connecting part facing the claw assembly and a surface of the connecting part facing away from the claw assembly; and
the connecting part through hole communicates with the lens base through hole, and an end of the positioning pin passes through the connecting part through hole and the lens base through hole, and is inserted into the through hole of the claw.

16. The optical module according to claim 15, wherein the shell includes an upper shell, the upper shell includes a limiting protrusion extending toward the circuit board, and the limiting protrusion includes a step disposed on a surface of the limiting protrusion facing the lens assembly; and
another end of the positioning pin protrudes from the surface of the lens base facing away from the claw assembly, and abuts against the step.

17. The optical module according to claim 1, wherein the lens base includes a first groove disposed on a surface of the lens base facing away from the circuit board, and a surface of the first groove proximate to the circuit board is obliquely disposed to form a reflective surface, and the reflective surface is configured to change the propagation direction of the optical signal incident into the lens assembly.

18. The optical module according to claim 17, wherein the optical module comprises the light-transmitting chip and the light-receiving chip;
the lens base further includes:
a first collimating lens disposed on a surface of the lens base proximate to the circuit board, and the first collimating lens corresponding to a position of the light-transmitting chip; and
a first focusing lens disposed on the surface of the lens base proximate to the circuit board, and the first focusing lens corresponding to a position of the light-receiving chip.

19. The optical module according to claim 18, wherein the connecting part further includes:
a second collimating lens disposed on a surface of the connecting part facing the claw assembly, and the second collimating lens being located on an optical path of the light-receiving chip;
a second focusing lens dispose on the surface of the connecting part facing the claw assembly, and the second focus lens being located on an optical path of the light-transmitting chip; and
a light-passing slot disposed on a surface of the connecting part facing the claw assembly,
wherein the second collimating lens and the second focusing lenses are disposed in the light-passing slot.

* * * * *